(12) United States Patent
Ikeda

(10) Patent No.: US 7,095,434 B1
(45) Date of Patent: Aug. 22, 2006

(54) IMAGE SENSING APPARATUS WITH SENSOR DISPLACEMENT CAPABILITY

(75) Inventor: Eiichiro Ikeda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 1768 days.

(21) Appl. No.: 08/505,608

(22) Filed: Jul. 21, 1995

(30) Foreign Application Priority Data

Jul. 22, 1994 (JP) .............................................. 6-171357

(51) Int. Cl.
*H04N 5/225* (2006.01)
*H04N 3/14* (2006.01)

(52) U.S. Cl. .............................. 348/219.1; 348/207.1; 348/229.1; 348/279; 348/362

(58) Field of Classification Search ................. 348/362, 348/219, 218, 264
See application file for complete search history.

(56) References Cited

U.S. PATENT DOCUMENTS

| | | | | | |
|---|---|---|---|---|---|
| 5,144,442 A | * | 9/1992 | Ginosar et al. | ............. | 348/362 |
| 5,309,243 A | * | 5/1994 | Tsai | ............................ | 348/362 |
| 5,386,228 A | * | 1/1995 | Okino | ........................ | 348/218 |
| 5,402,171 A | * | 3/1995 | Tagami et al. | .............. | 348/219 |
| 5,420,635 A | * | 5/1995 | Konishi et al. | ............. | 348/362 |
| 5,625,411 A | * | 4/1997 | Inuiya et al. | ............... | 348/296 |

\* cited by examiner

*Primary Examiner*—Wendy R. Garber
(74) *Attorney, Agent, or Firm*—Morgan & Finnegan, LLP

(57) ABSTRACT

A plurality of images in which pixels are displaced from each other are obtained by displacing the optical path of light passing an image sensing device. The plurality of images have different exposure amounts in image sensing operations. In order to obtain an image with a high resolution and a broad dynamic range, a pixel of interest which suffers saturation or dark in one image is interpolated by pixels in the vicinity of the pixel of interest in an image sensed in a different exposure amount.

63 Claims, 24 Drawing Sheets

FIG. 1 Prior Art
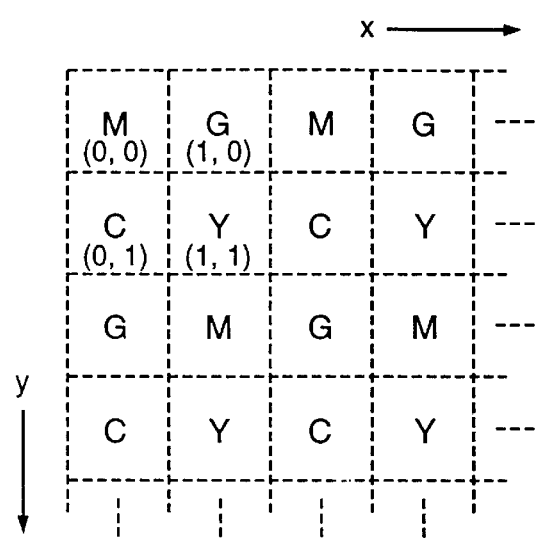
Prior Art FIG. 2
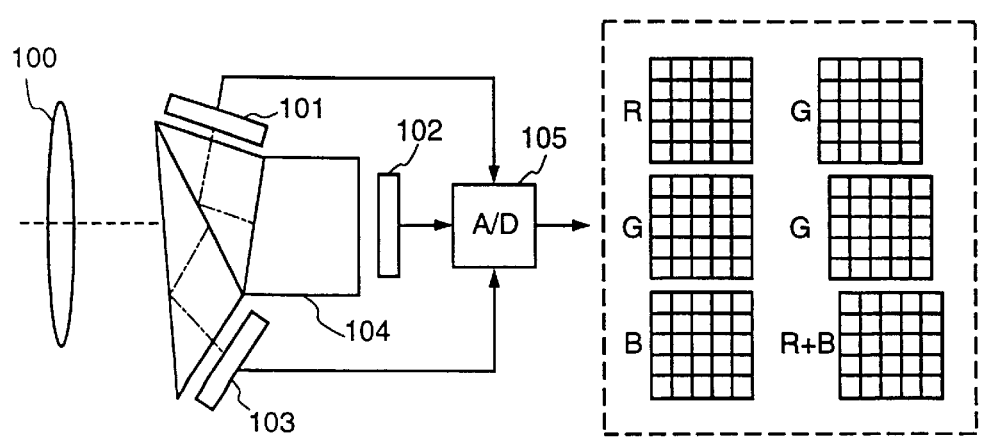

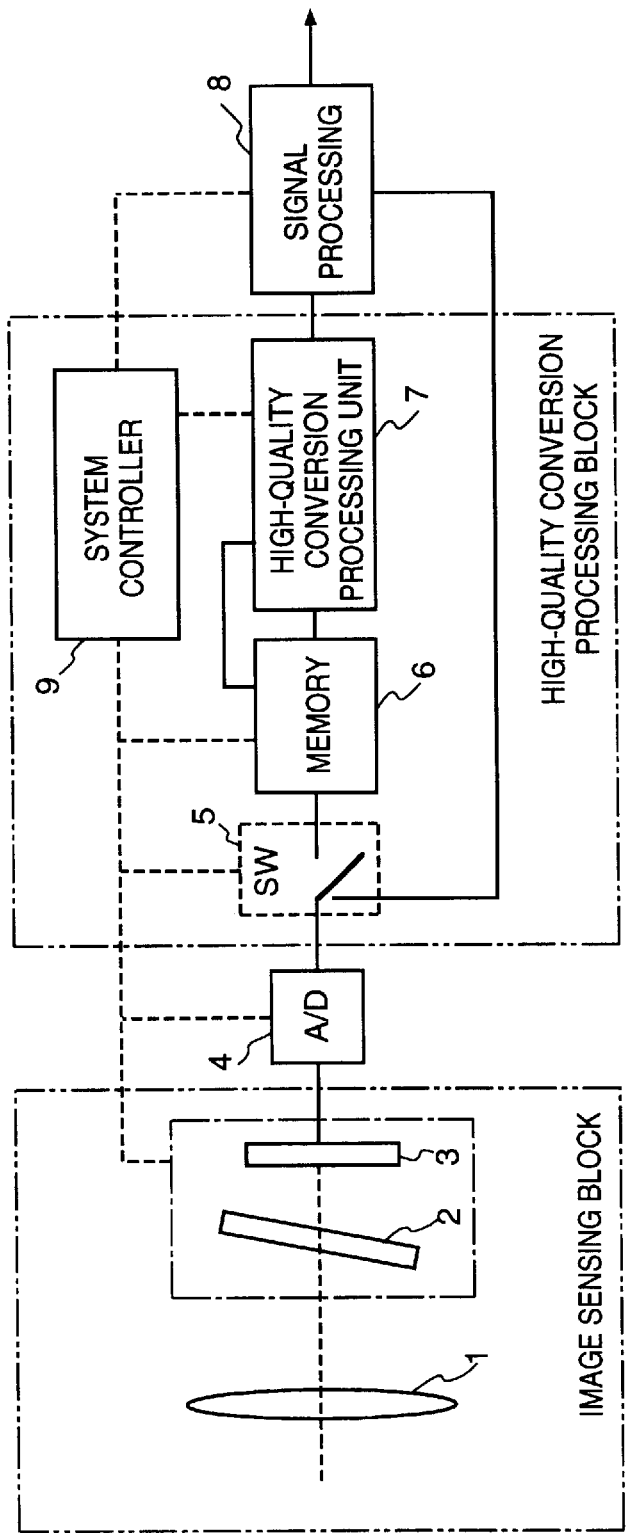

ROTARY PRISM

VARIABLE ANGLE PRISM

REFLECTION TYPE DEFLECTING SYSTEM

DISPLACABLE PRISM

DISPLACABE LENS

F I G. 8A

| M (0,0) | G (1,0) | M | G | --- |
|---|---|---|---|---|
| C (0,1) | Y (1,1) | C | Y | --- |
| G | M | G | M | --- |
| C | Y | C | Y | --- |

FIRST IMAGE (NORMAL)

F I G. 8B

| G | M | G | M | --- |
|---|---|---|---|---|
| Y | C | Y | C | --- |
| M | G | M | G | --- |
| Y | C | Y | C | --- |

SECOND IMAGE (UNDER)

F I G. 8C

| Y | C | Y | C | --- |
|---|---|---|---|---|
| G | M | G | M | --- |
| Y | C | Y | C | --- |
| M | G | M | G | --- |

THIRD IMAGE (UNDER)

F I G. 8D

| C | Y | C | Y | --- |
|---|---|---|---|---|
| M | G | M | G | --- |
| C | Y | C | Y | --- |
| G | M | G | M | --- |

FOURTH IMAGE (UNDER)

F I G. 8E

| M(G)(Y)C | G(M)(C)Y | M(G)(Y)C | G(M)(C)Y | --- |
|---|---|---|---|---|
| C(Y)(G)M | Y(C)(M)G | C(Y)(G)M | Y(C)(M)G | --- |
| G(M)(Y)C | M(G)(C)Y | G(M)(Y)C | M(G)(C)Y | --- |
| C(Y)(M)G | Y(C)(G)M | C(Y)(M)G | Y(C)(G)M | --- |

PROPERLY EXPOSED    IMPROPERLY EXPOSED (UNDER)

M : PROPERLY EXPOSED
(M): IMPROPERLY EXPOSED
(UNDER EXPOSED)

MAGENTA

G : PROPERLY EXPOSED
(G): IMPROPERLY EXPOSED
(UNDER EXPOSED)

GREEN

C : PROPERLY EXPOSED
(C): IMPROPERLY EXPOSED
(UNDER EXPOSED)

CYAN

Y : PROPERLY EXPOSED
(Y): IMPROPERLY EXPOSED
(UNDER EXPOSED)

YELLOW

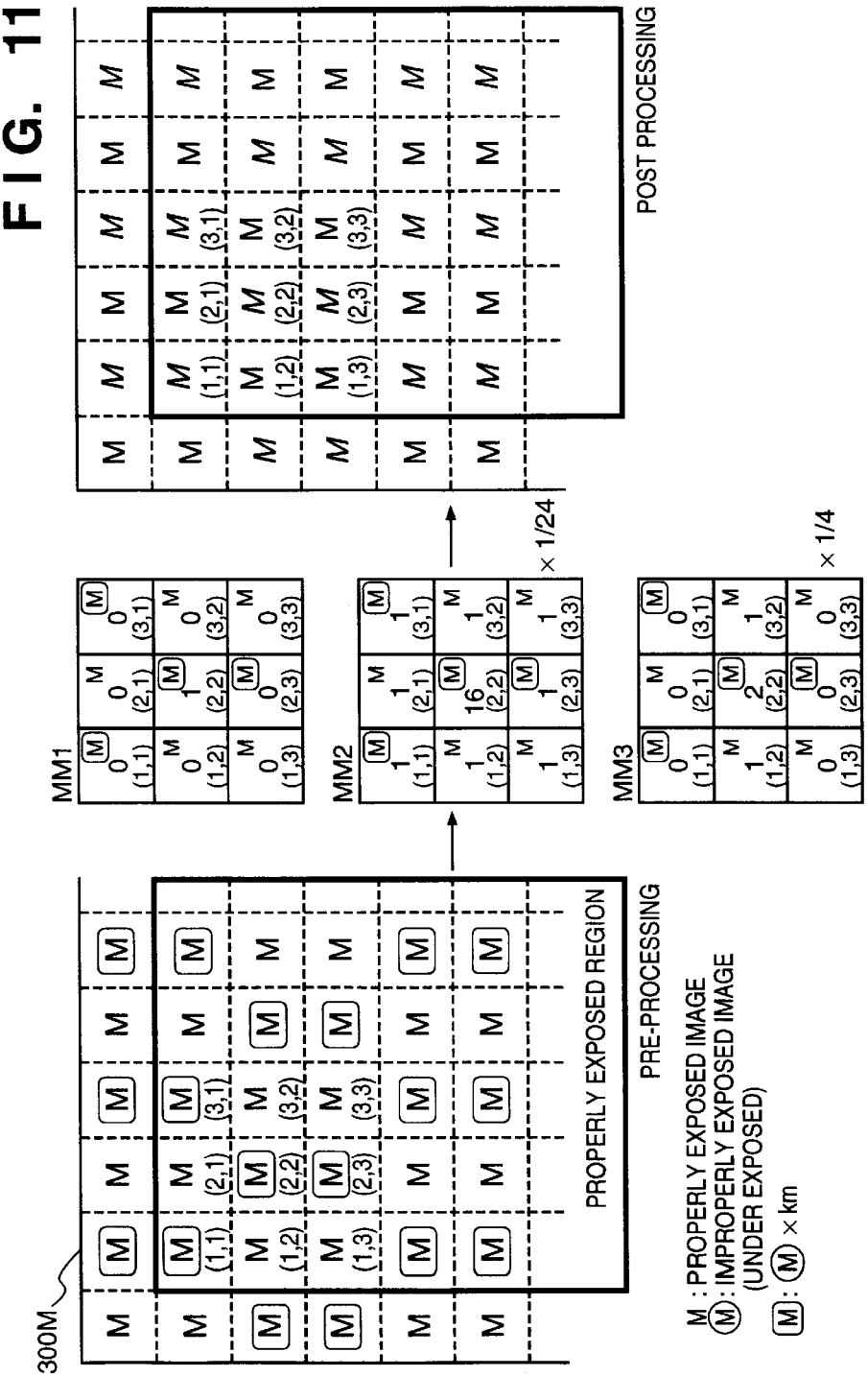

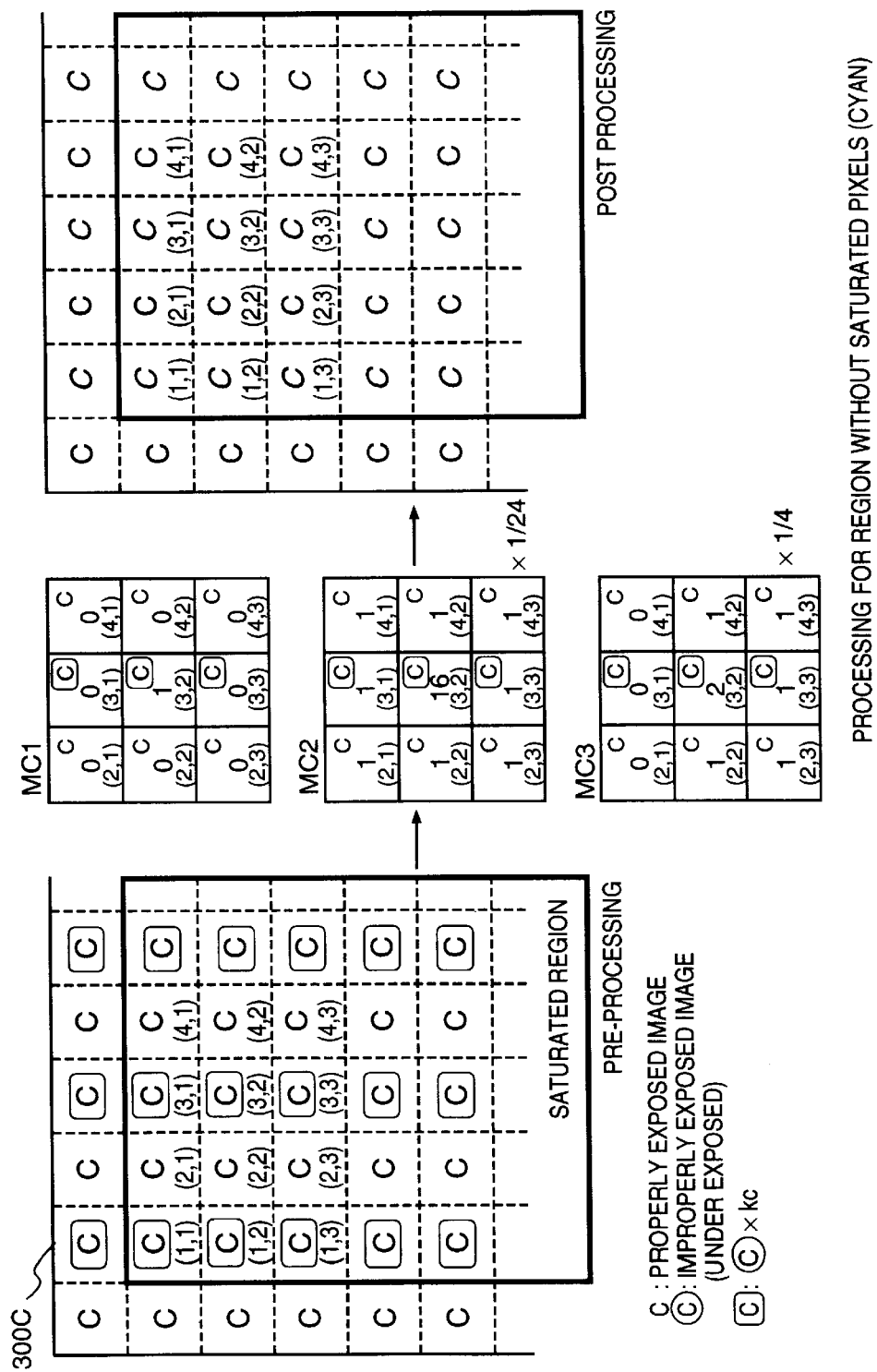

MAGENTA

GREEN

CYAN

YELLOW

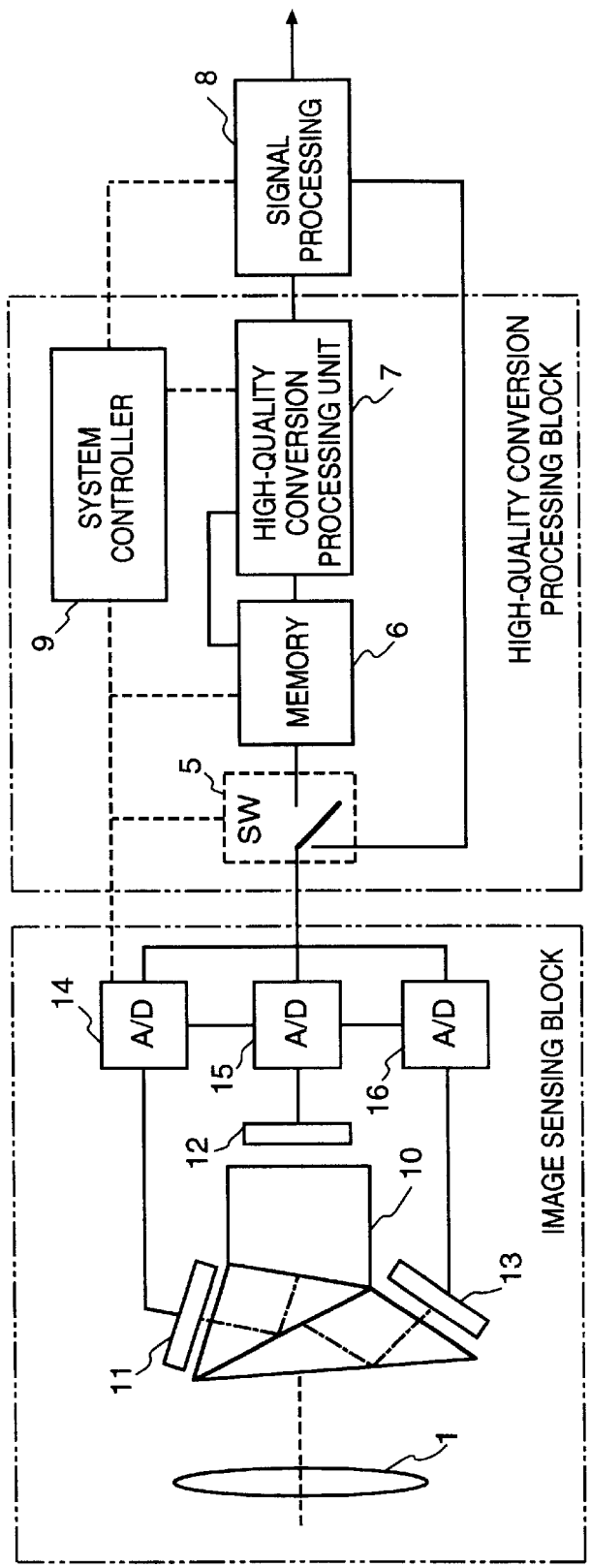

IMAGE SENSING APPARATUS WITH SENSOR DISPLACEMENT CAPABILITY

BACKGROUND OF THE INVENTION

FIELD OF THE INVENTION

The present invention relates to an image sensing apparatus such as a color video camera, which uses an image sensing device and an image processing method for an image sensed by the image sensing device.

DESCRIPTION OF THE RELATED ART

In recent years, image sensing devices such as CCD devices are popularly used as image pickup elements for television cameras, video cameras, electronic cameras, and the like. Currently, efforts are made to increase the resolution of such image sensing device, and consequently, the resolution is increased by decreasing the size of each pixel of an image sensing device to increase the number of pixels. Recently, high-resolution sensors with 800,000 to 2,000,000 pixels have been developed.

However, such high-resolution sensors are very expensive. The high-resolution sensors inevitably suffer drawbacks such as dark, saturation, a narrow dynamic range, and the like, and the resolution has an upper limit. The image sensing device is inferior to silver halide media in terms of the dynamic range, and an image obtained by an image sensing device has considerably low quality depending on the sensing conditions.

In a single plate type image sensing apparatus, a color filter having a repetitive period of colors, as shown in FIG. 1, is adhered to the light-receiving surface of an image sensing device so as to obtain color signals. In such an image sensing apparatus, in order to prevent aliasing noise in a low-frequency range caused by high-frequency signal components which do not satisfy the condition of the Nyquist theorem, i.e., moiré, arranged is a low-pass filter for eliminating any high-frequency components of an object. The low-pass filter serves as a bottleneck upon realizing high resolution in the single plate type image sensing apparatus.

In order to increase the resolution of imaging sensing devices, an image sensing apparatus shown in FIG. 2 has been proposed. Referring to FIG. 2, reference numeral 100 denotes a lens; 104, a prism for splitting an optical image from the lens 100 into respective wavelength components, and imaging these components on image sensing devices 101 to 103; and 105, an A/D converter for converting image sensing signals output from the image sensing devices 101 to 103 into digital signals. Such image sensing apparatus uses a plurality of image sensing devices (in FIG. 2, three devices 101, 102, and 103). The image sensing devices 101 to 103 are disposed to be displaced from each other by several pixels (half a pixel in FIG. 2) in units of pixels for photoelectric conversion, thereby preventing generation of moiré, and increasing the resolution. Note that an operation for displacing image sensing devices by several pixels for the purpose of increasing the resolution will be referred to as "pixel-displacement" hereinafter.

In order to broaden the dynamic range, a technique for sensing an image of an identical scene in different exposure amounts to obtain a plurality of image signals, and processing the plurality of image signals is proposed in, e.g., Japanese Patent Laid-Open No. 5-41071, and the like. Further, disclosed in Japanese Patent Laid-Open No. 63-306778, a technique for replacing image data of defective regions such as a region which is saturated, a region which suffers dark due to noise with those of proper regions which correspond to the defective regions and suffer neither of saturation and dark is proposed.

In the prior arts above, the improvement of the resolution by means of "pixel-displacement", the improvement of the dynamic range, and the like have been individually attained. However, no technique for obtaining an image not only with a high resolution but a broad dynamic range has been proposed yet.

SUMMARY OF THE INVENTION

The present invention has been made to solve the above-mentioned problems, and has as its object to provide an image sensing method and apparatus, which can obtain high-quality image data with a high resolution and a broad dynamic range.

In order to achieve the above object, according to one aspect of the present invention, there is provided an image sensing apparatus comprising:

an image sensing device which has a predetermined number of pixels and senses an object to obtain an image signal;

displacing means for displacing a relative position between an optical image of an object and said image sensing device during an image sensing operation by said image sensing device; and control means for controlling said displacing means to displace the relative position between the optical image of the object and said image sensing device in each of a plurality of image sensing operations for the object, and controlling said image sensing device to perform at least one of the plurality of image sensing operations in a different exposure amount.

In order to achieve the above object, according to another aspect of the present invention, there is provided an image sensing apparatus comprising:

a plurality of image sensing devices each of which has a predetermined number of pixels and senses an object to obtain an image signal, and which are displaced from each other by a predetermined distance in a direction perpendicular to an optical axis; and control means for controlling said plurality of image sensing devices to respectively sense the object, and controlling at least one of said image sensing devices to perform an image sensing operation in a different image sensing exposure amount during the image sensing process.

In order to achieve the above object, according to the present invention, there is provided an image processing method for sensing a single object by image sensing means to obtain a plurality of images, and generating an image with a high resolution and a broad dynamic range by processing the plurality of images, comprising the steps of:

acquiring the plurality of images which are displaced from each other by a predetermined distance in a predetermined direction, via said image sensing means; and generating an image with a high resolution and a broad dynamic range by executing predetermined processing for pixel data at a predetermined position in the plurality of images on the basis of information associated with displacement directions and distances of the corresponding images, and information associated with exposure amounts of the images.

According to the present invention with the above arrangements, a plurality of images which are displaced from each other in a predetermined direction by a predetermined amount are acquired in different predetermined exposure amounts, and a target image is finally generated on the basis of these acquired images. The displacement between the pixels assures a high resolution. Since a target image is generated on the basis of pixels with a known predetermined amount at predetermined positions, a broad dynamic range can be attained.

It is another object of the present invention to provide an image sensing apparatus and an image processing method, in which interpolation is performed on the basis of pixel data of neighboring pixels upon generation of a target image.

It is still another object of the present invention to provide an image sensing apparatus and an image processing method, in which an image in an under exposure amount and an image with an over exposure amount are acquired, and interpolation is performed on the basis of these images.

It is still another object of the present invention to provide an image sensing apparatus and an image processing method, which can interpolate saturated pixels or darkened pixels.

In order to achieve the above objects, according to the present invention, there is provided an image sensing apparatus comprising:

image sensing means for forming a plurality of images of a single object which are displaced from each other by a predetermined distance in a predetermined direction; and control means for setting an exposure amount for at least one image to be different from exposure amounts for other images upon formation of the plurality of images by the image sensing means.

It is still another object of the present invention to provide a synthesizing method and apparatus, which can generate an image with a high resolution and a broad dynamic range on the basis of a plurality of externally input images.

In order to achieve the above object, there is provided a synthesizing apparatus comprising:

input means for inputting a plurality of images which are formed based on a single object and are displaced from each other, an exposure amount for at least one of the plurality of images being different from exposure amounts for other images of the plurality of images; and synthesizing means for synthesizing the plurality of images input from the input means.

In order to achieve the above object, there is provided a synthesizing method comprising the steps of:

inputting a plurality of images which are formed based on a single object and are displaced from each other, an exposure amount for at least one of the plurality of images being different from exposure amounts for other images of the plurality of images; and synthesizing the plurality of input images.

In order to achieve the above object, there is provided an image sensing method comprising:

the image sensing step of forming a plurality of images which are formed based on a single object and are displaced from each other; and the control step of setting an exposure amount for at least one of the plurality of images to be different from exposure amounts for other images of the plurality of images upon formation of the plurality of images in the image sensing step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a view showing the arrangement of a color filter used in a conventional apparatus;

FIG. 2 is a view showing the arrangement of a conventional image sensing apparatus which can obtain a high resolution;

FIG. 3 is a block diagram showing the first embodiment of the present invention;

FIGS. 8A to 8D are views for explaining the color dispositions of four images obtained as a result of the pixel-displacement processing shown in FIG. 6;

FIG. 8E is a view showing the fact that each pixel of an image obtained by synthesizing the four images shown in FIGS. 8A to 8D has all the color components;

FIGS. 11 to 14 are views for explaining the principle of dynamic range broadening processing in the first embodiment;

FIGS. 16A to 16F and FIGS. 17A to 17E are views showing the arrangements of various filters used in the first embodiment;

FIGS. 20 and 21 are views for explaining the principle of dynamic range broadening processing in the first embodiment;

FIG. 25 is a block diagram showing the second embodiment of the present invention;

DESCRIPTION OF THE PREFERRED EMBODIMENTS

First Embodiment

Figure 4:
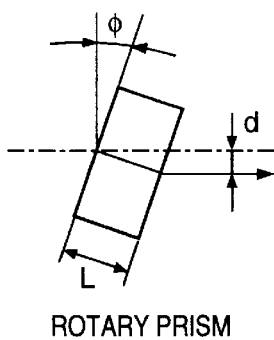
FIG. 4 is a view showing an example of optically correcting means used in the first embodiment.

FIG. 3 is a schematic block diagram showing an image sensing apparatus according to the first embodiment of the present invention.

Arrangement of Apparatus

The image sensing apparatus of this embodiment is divided into an image sensing block and high-quality conversion processing block, as shown in FIG. 3.

Referring to FIG. 3, reference numeral 1 denotes a lens; 2, a rotary prism serving as optically correcting means for correcting the optical path of light from the lens 1; 3, an image sensing device; 4, an A/D converter for converting an analog signal from the image sensing device 3 into a digital signal; 5, a selection switch; 6, a memory; 7, a high-quality conversion processing unit; 8, a signal processing unit; and 9, a system controller. The switch 5 selectively supplies the digital signal from the A/D converter 4 to the memory 6 or the signal processing unit 8. Also, in FIG. 3, solid lines indicate paths for an image signal, and broken lines indicate paths for a control signal.

Pixel-Displacement

An operation of the first embodiment will be described below. An object image (not shown) is projected onto the image sensing device 3 via the lens 1 and the rotary prism 2. In this embodiment, the image sensing device 3 comprises a complementary color filter with the arrangement shown in FIGS. 1, 2. The rotary prism 2 as the optically correcting means performs so-called "pixel-displacement" for projecting an object image onto the image sensing device 3 while displacing it by several pitches (more than zero pitch) with respect to photoelectric conversion pixels (units of pixels for photoelectric conversion). More specifically, an object image obtained by the image sensing device 3 based on a light beam transmitted through the rotary prism 2 at a given timing, and an object image obtained by the image sensing device 3 based on a light beam transmitted through the rotary prism 2, which is rotated through a predetermined angle after the given timing, are displaced from each other by several pixels. FIG. 4 shows the principle of the rotary prism.

Figure 5A:
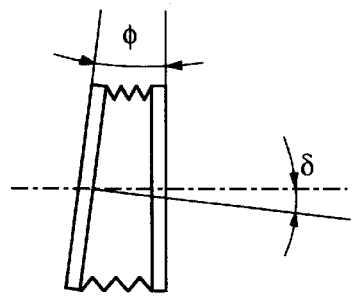
FIGS. 5A to 5D are views showing other examples of the optically correcting means.
Figure 5B:
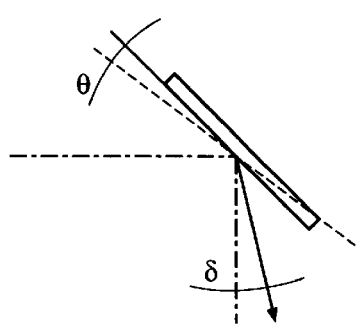
Figure 5C:
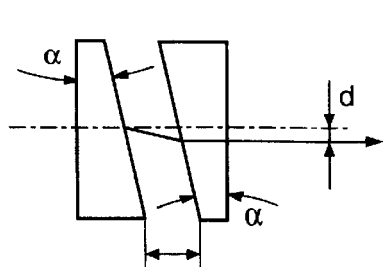
Figure 5D:
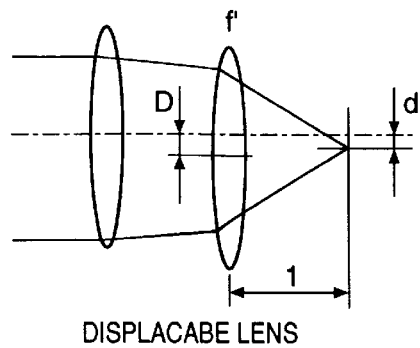

In place of the rotary prism 2, the optically correcting means may comprise a variable angle prism VAP (the optical path changes by δ when an apex angle φ changes) shown in FIG. 5A, a reflection type deflecting prism (the reflection angle changes by δ when the prism angle with respect to incident light rays changes by φ) shown in FIG. 5B, displaceable prisms (the optical path of exit light rays is displaced by d from the center of the optical axis when the distance, D, between the prisms changes) shown in FIG. 5C, displaceable lenses (the optical path of exit light rays is displaced by d from the center of the optical axis when a rear lens is displaced by the distance, D, from the center of the optical axis) shown in FIG. 5D, and the like. More specifically, the optically correcting means is not particularly limited as long as a "pixel-displacement" effect is obtained among a plurality of images obtained by a plurality of image sensing means. In place of the above-mentioned pixel-displacement using the image sensing devices 101 to 103 shown in FIG. 2, the above-mentioned object may be achieved by improving color reproducibility by respectively irradiating R, G, and B light beams onto the image sensing devices 101 to 103 (the same resolution as that of a black-and-white image can be obtained) or disposing the image sensing devices 101 to 103 to be displaced from each other by several pitches (e.g., half the pitch) of photoelectric conversion pixels.

Referring back to FIG. 3, the operation of the image sensing apparatus of this embodiment will be described below.

Figure 6:
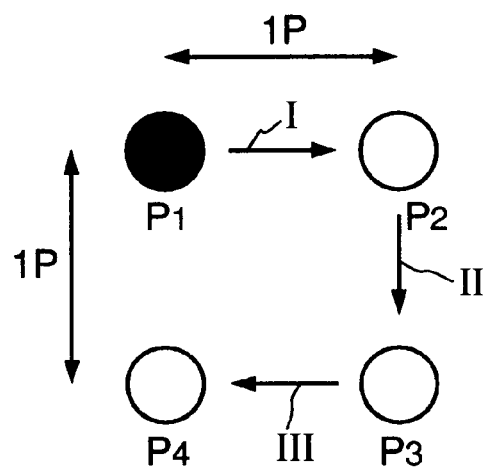
FIG. 6 is a view showing the direction and amount of pixel-displacement used in the first embodiment.
Figure 7:
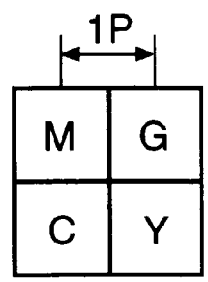
FIG. 7 is a view showing the unit of the pixel displacement amount.

The system controller controls the rotation angle of the rotary prism 2, and the image sensing timing and exposure amount of the image sensing device 3. FIG. 6 shows shifts of a pixel when the controller 9 changes the posture of the prism 2 in four ways. In FIG. 6, position $P_1$ corresponds to a reference pixel with no displacement, and a position $P_2$ corresponds to a position after the reference pixel is displaced from the position $P_1$ in a direction I by the "pixel-displacement". Position $P_3$ corresponds to a position after the reference pixel is displaced from the position $P_2$ in a direction II by the "pixel-displacement". Position $P_4$ corresponds to a position after the reference pixel is displaced from the position $P_3$ in a direction III by the "pixel-displacement". Note that the distance, 1P, of one pixel corresponds to the distance between two pixels of the color filter, as shown in FIG. 7.

When an image sensing operation is performed after each pixel-displacement shown in FIG. 6, images shown in FIGS. 8A to 8D are obtained. More specifically, each time a pixel-displacement (I→II→III) is performed, an image signal from the image sensing device is converted into a digital signal by the A/D converter 4, and the digital signal is stored in the memory 6.

Exposure Control

The control sequence for performing an image sensing operation after each pixel-displacement by the controller 9 will be described below with reference to the flow chart in FIG. 9A. Note that the control sequence shown in this flow chart corresponds to the pixel-displacement operations in the order shown in FIG. 6, i.e., is to pick up four images.

Figure 9A:
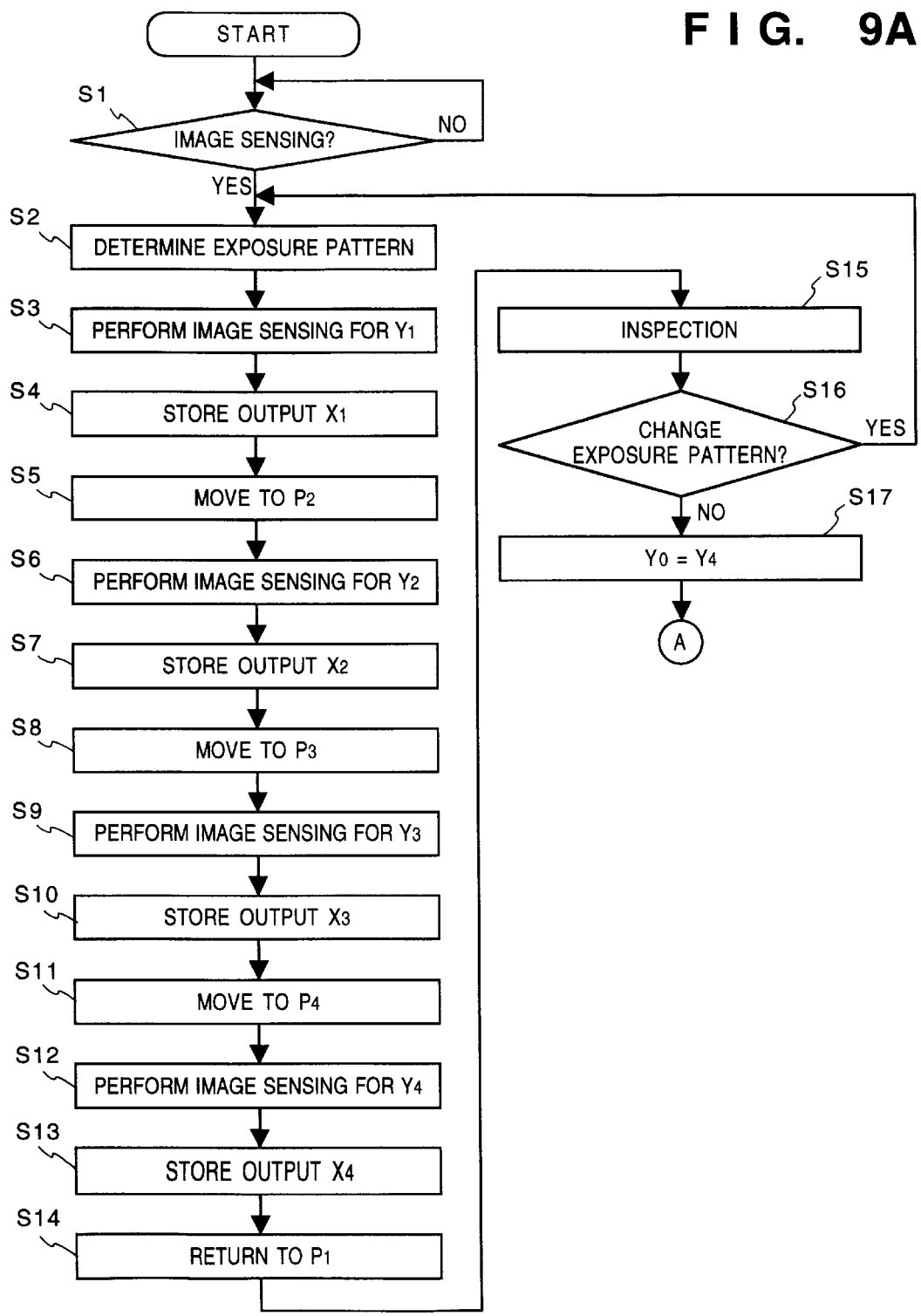
FIG. 9A is a flow chart showing the control sequence of the first embodiment.
Figure 9B:
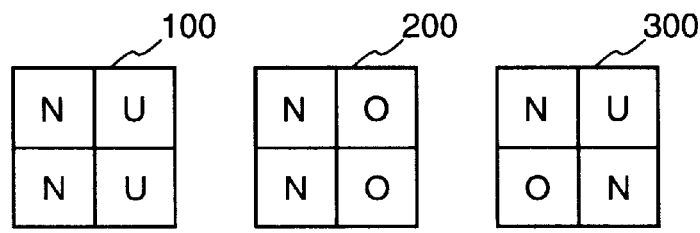
FIG. 9B is a view showing various exposure patterns used in the first embodiment.

In step S1 in FIG. 9A, it is checked if an image sensing operation has been performed. If an image sensing operation is performed, an exposure pattern is determined in step S2. In correspondence with the pixel-displacement pattern shown in FIG. 6, three exposure patterns shown in FIG. 9B are prepared. In FIG. 9B, N denotes normal exposure, O denotes over exposure, and U denotes under exposure. As will be described later, objects have various luminance dynamic ranges. For example, a certain object may have a short light amount (dark), another object may have an excessive light amount (saturation), or still another object may have a short light amount in one portion and an excessive light amount in another portion. As will be described later, since the apparatus of this embodiment replaces image data of a dark or saturated portion with that of another image, four images need to be sensed in an exposure pattern corresponding to the light amount distribution of a target object. Therefore, the exposure pattern is determined in step S2. Assume that exposure pattern 100 shown in FIG. 9B is determined in step S2. According to the exposure pattern 100, an image sensing operation in a normal exposure (indicated by N in FIG. 9B) is performed at the point $P_1$, an image sensing operation in an under exposure (indicated by U in FIG. 9B) is performed at the point $P_2$, an image sensing operation in an under exposure is performed at the point $P_3$, and an image sensing operation in a normal exposure is performed at the point $P_4$. Note that the pattern 100 is a default pattern in the apparatus of the embodiment.

If the pattern 100 is determined, an optical image is incident at the position $P_1$ (FIG. 6) in S3. At the position $P_1$, an image sensing operation is performed for a charge accumulation time $Y_1$. Where the exposure pattern is the pattern 100, $Y_1$ is given by:

$$Y_1 = Y_0 - \left( \frac{X_1(n-1) + X_2(n-1) + X_3(n-1) + X_4(n-1)}{4} - X_0 \right)$$

where $X_1(n-1)$, $X_2(n-1)$, $X_3(n-1)$, and $X_4(n-1)$ are the signal levels of the average values of image data of all the pixels at the positions $P_1$, $P_2$, $P_3$, and $P_4$ obtained in the previous four image sensing operations, and $Y_0$ is the previously measured accumulation time. $X_0$ is the reference signal level. Controlling the accumulation time means controlling the exposure amount. In step S4, an image output $X_1$ obtained in step S3 is stored in the image memory 6. In step S5, the incident position of the image moves to $P_2$. In step S6, an image sensing operation is performed based on an accumulation time $Y_2$ for the position $P_2$. If the exposure pattern is the pattern 100, $Y_2$ can be calculated by subtracting a predetermined time a from accumulation time $Y_1$ for the position $P_1$. That is, $$Y_2 = Y_1 - a$$

An image sensing operation is performed the accumulation time $Y_2$. An image output $X_2$ obtained by this exposure is stored in the memory 6 in step S7. In step S8, the incident position moves to $P_3$. In step S9, an image sensing operation is performed based on an accumulation time $Y_3$ for the incident position $P_3$. Where the exposure pattern is the pattern, 100 the accumulation time $Y_3$ equals the accumulation time $Y_2$ for $P_2$.

$$Y_3 = Y_2$$

An output $X_3$ at this time is stored in the memory 6 (step S10). Furthermore, the incident position moves to $P_4$ (step S11), and an image sensing operation is performed based on an accumulation time $Y_4$. An output $X_4$ obtained at this time is stored in the memory 6. If the exposure pattern is the pattern 100, the accumulation time $Y_4$ is obtained by adding the predetermined time a from the accumulation time $Y_3$ for $P_3$. The output $X_4$ is stored in the memory 6 (step S13). At this time, $$Y_4 = Y_3 + a = Y_1$$

In step S14, the incident position returns to the position $P_1$. In step S15, it is checked if the four obtained images suffer saturation or dark. It is then checked in step S16 if the exposure pattern determined in step S2 need be changed. If the four images include a dark region, an image sensed in an under exposure cannot be used, and an image sensed in an over exposure is required. The exposure must be re-done using, for example, a pattern 200 shown in FIG. 9B. If the exposure must be re-done, the flow returns to step S2 to repeat the above-mentioned control sequence. If it is determined in step S16 that the exposure pattern need not be changed, the four obtained images can be used in processing for improving a dynamic range. Therefore, for the purpose of fetching the next four images, the value $Y_0$ is updated in step S17. More specifically, $Y_0 = Y_4$ is set.

Upon repetition of the above-mentioned steps, image sensing operations are performed at the positions $P_1$ and $P_4$ based on an accumulation time which provides an almost neutral exposure, and image sensing operations performed at the positions $P_2$ and $P_3$ based on an accumulation time which provides an under exposure.

Broadening of Dynamic Range

The image signals of the four images read out from the memory 6 are subjected to the following processing in the high-quality conversion processing unit 7 to attain a high resolution and a broad dynamic range. Thereafter, the processed signals are supplied to the signal processing unit 8 to be converted into R, G, and B signals and a Y signal. Then, these signals are output.

A technique for obtaining both the pixel-displacement effect and the dynamic range broadening effect as the characteristic feature of the present invention will be explained below.

As described above, the apparatus of this embodiment uses the color filter on which four complementary colors M, G, Y, and C are arranged, as shown in FIG. 1. Using the color filter with this arrangement, pixel-displacement is performed in the order and directions shown in FIG. 6, thus obtaining four images. In these four images, the pixel positions are respectively displaced from each other, as shown in FIGS. 8A to 8D. FIG. 8A shows the pixel arrangement of an image obtained without any displacement. FIG. 8B shows an image in which pixels are displaced from the arrangement shown in FIG. 8A to the left by one pixel when the filter is displaced from the non-displacement state to the right (in the direction I) by one pixel, as indicated by the position $P_2$ in FIG. 6. FIG. 8C shows an image in which pixels are displaced upward by one pixel from the arrangement shown in FIG. 8B when the filter is displaced downward (in the direction II) from the position $P_2$ in FIG. 6 to the position $P_3$ in FIG. 6. FIG. 8D shows an image in which pixels are displaced from the arrangement shown in FIG. 8C to the left by one pixel when the filter is displaced to the left (in the direction III) from the position $P_3$ in FIG. 6 to the position $P_4$ in FIG. 6 by one pixel.

When the four images obtained in this manner are virtually synthesized, all color signals M, G, Y, and C are obtained at an arbitrary one pixel position of the synthesized image. Therefore, all the color signals M, G, Y, and C are obtained at all the pixel positions. More specifically, in FIGS. 8A to 8D, image data of color M is assigned to the position (0, 0) of an image (first image) in FIG. 8A, image data of color G is assigned to the position (0, 0) of an image (second image) in FIG. 8B, image data of color Y is assigned to the position (0, 0) of an image (third image) in FIG. 8C, and image data of color C is assigned to the position (0, 0) of an image (fourth image) in FIG. 8D. Therefore, four colors M, G, Y, and C are assigned to the position (0, 0) of the virtually synthesized image. Since the four colors are assigned to one pixel position, the same applies to all the pixel positions other than the position (0, 0), as shown in FIG. 8E. Obtaining the four colors at one pixel position is the effect obtained as a result of the color-displacement control in the apparatus of this embodiment.

Upon concurrent execution of the pixel-displacement control shown in FIG. 6 and the exposure control shown in FIG. 9A, the first image (FIG. 8A) is obtained in a normal exposure amount at the displacement position $P_1$. The second image (FIG. 8B) is obtained in an under exposure amount at the displacement position $P_2$. The third image (FIG. 8C) is obtained in an under exposure amount at the displacement position $P_3$. The fourth image (FIG. 8D) is obtained in a normal exposure amount at the displacement position $P_4$. FIG. 8E shows the virtually synthesized state of the four obtained images. In FIG. 8E, image data obtained in an improper exposure (i.e., under exposure) are enclosed with circles, e.g. . . . , $\hat{G}$, $\hat{Y}$, and so on.

In order to broaden the dynamic range, a saturated region and a dark portion (noise region) must be eliminated. If a saturated region occurs in a proper exposure image, it is effective to replace and synthesize this portion with an image sensed in an under exposure amount. On the other hand, in order to eliminate the dark portion (noise region) in a proper exposure image, it is effective to replace and synthesize this portion with an image sensed in an over exposure amount.

A technique for broadening the dynamic range by eliminating a saturated portion will be explained below.

As described above, in order to eliminate a saturated region, it is effective to replace and synthesize this portion with an image sensed in an under exposure amount. When the above-mentioned control sequence shown in the flow chart in FIG. 9A is applied to the exposure pattern 100, images sensed in a proper exposure and images sensed in an under exposure are obtained. In this case, in the control sequence shown in FIG. 9A, the duration of the correction time a is set to have a proper value so as to not generate a saturated region in an image sensed in an exposure amount smaller than a normal exposure amount.

As a result of the image sensing operations, the first and fourth images are sensed in a proper exposure amount, and the second and third images are sensed in an improper exposure amount (under exposure amount). In addition, the synthesized image of these images can include all the image signals M, G, Y, and C per pixel, as has been described with reference to FIG. 8E. However, since these images are sensed in different exposure amounts, a synthesized image signal cannot be generated using these values. For this reason, in the apparatus of this embodiment, the high-quality conversion processing unit 7 obtains a single image with a high resolution and a broad dynamic range on the basis of the image signals stored in the memory 6.

The processing method in the high-quality conversion processing unit 7 will be explained below.

By re-arranging the four obtained image data (stored in the memory 6) shown in FIGS. 8A to 8D, four images shown in FIGS. 10A to 10D are generated. By re-arrangement, images respectively consisting of only magenta (M), green (G), cyan (C), and yellow (Y) pixels are generated, as shown in FIGS. 10A, 10B, 10C, and 10D. In the re-arranged images shown in FIGS. 10A to 10D, image data of pixels enclosed in circles are those of the images sensed in an under exposure. The re-arrangement will be explained in more detail below.

Figure 10A:
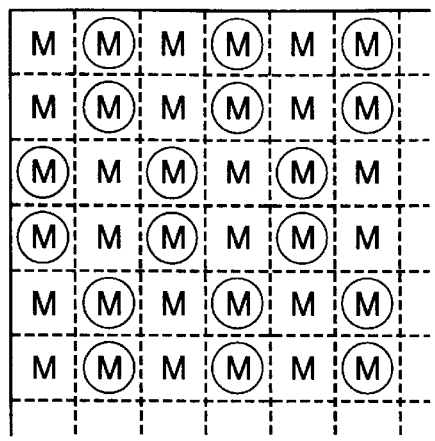
FIGS. 10A to 10D are views showing images in units of colors, which are obtained as a result of re-arranging the four images shown in FIGS. 8A to 8D in units of color components.
Figure 10B:
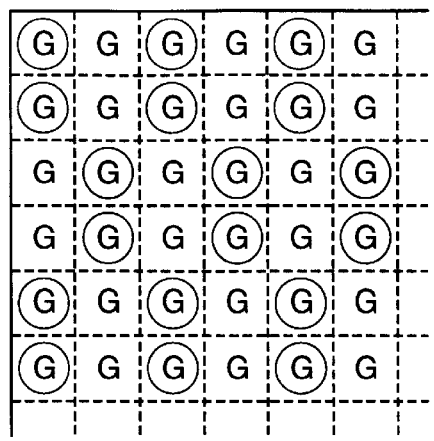
Figure 10C:
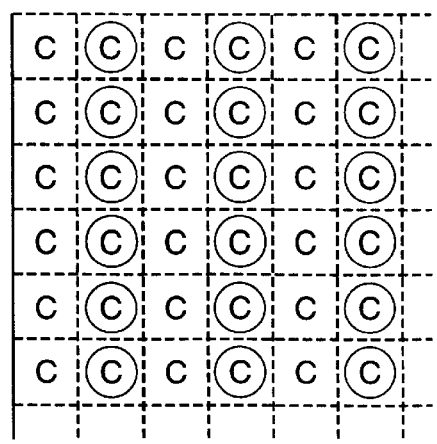
Figure 10D:
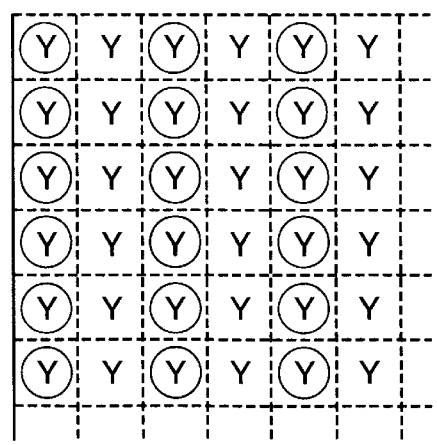

M image data are located at the positions (0, 0), (2, 0), (1, 2), and (3, 2) in FIG. 8A showing a normal exposure image. Also, M image data are located at the positions (1, 0), (3, 0), (0, 2), and (2, 2) in FIG. 8B showing an under exposure image. Furthermore, M image data are located at the positions (1, 1), (3, 1), (0, 3), and (2, 3) in FIG. 8C showing an under exposure image. Moreover, M image data are located at the positions (0, 1), (2, 1), (1, 3), and (3, 3) in FIG. 8D showing a normal exposure image. Therefore, in the re-arranged M image (FIG. 10A), image data in the normal exposure are arranged at the positions (0, 0), (2, 0), . . . , (O, 1), (2, 1), . . . , (1, 2), (3, 2), . . . , (1, 3), and (3, 3), and image data in an under exposure (denoted by M̂ are arranged at the positions (1, 0), (3, 0), . . . , (1, 1), (3, 1) , . . . , (0, 2), (2, 2), . . . , (0, 3), and (2, 3). Similarly, G, C, and Y image data are obtained, as shown in FIGS. 10B, 10C, and 10D, respectively. In FIGS. 10A to 10D, proper and improper (under) exposure pixels alternately appear.

The illustrations of virtually re-arranged pixels like in FIGS. 10A to 10D can help to easily understand the dynamic range broadening processing of this embodiment.

Figure 13:
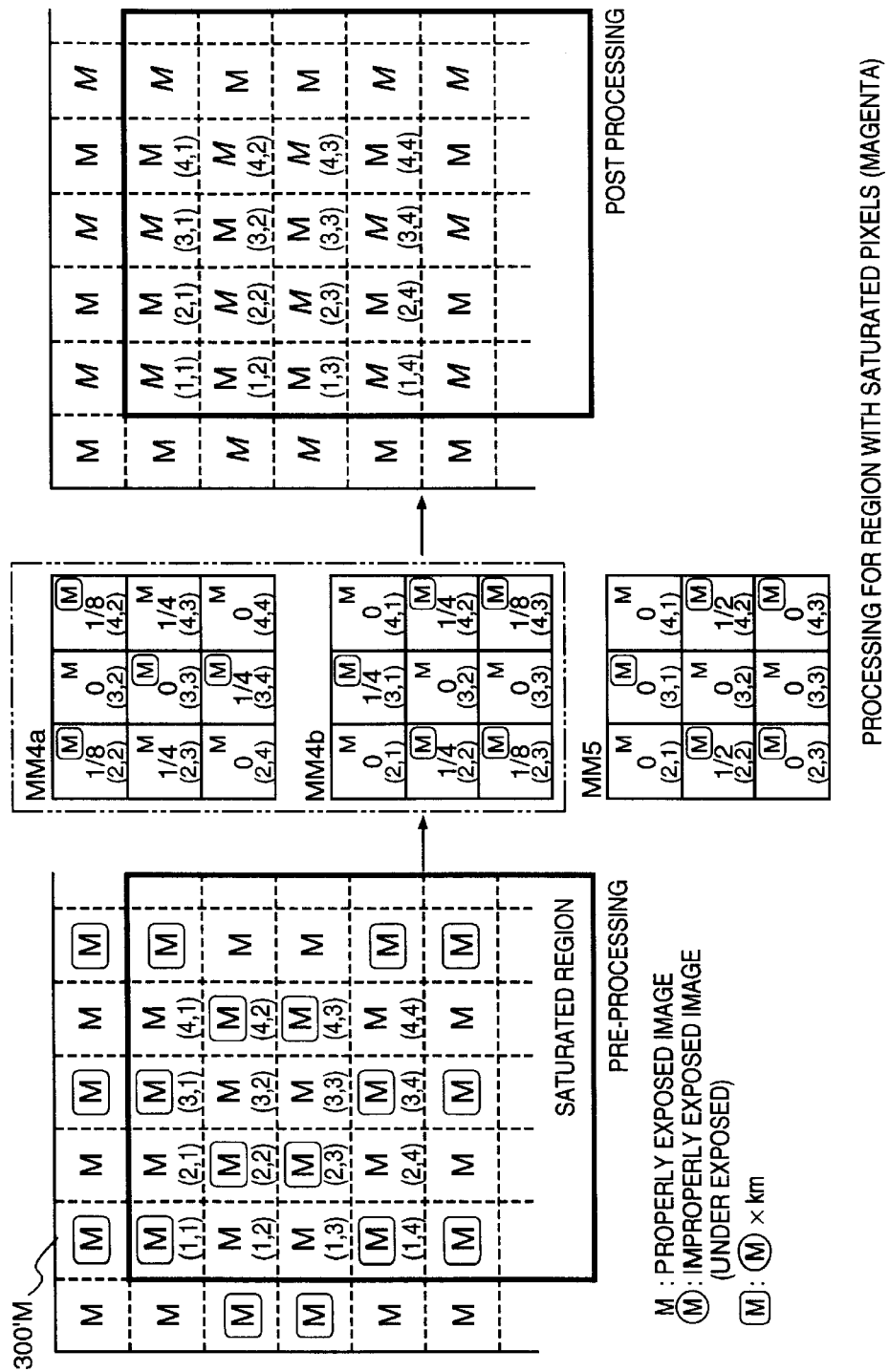
Figure 14:
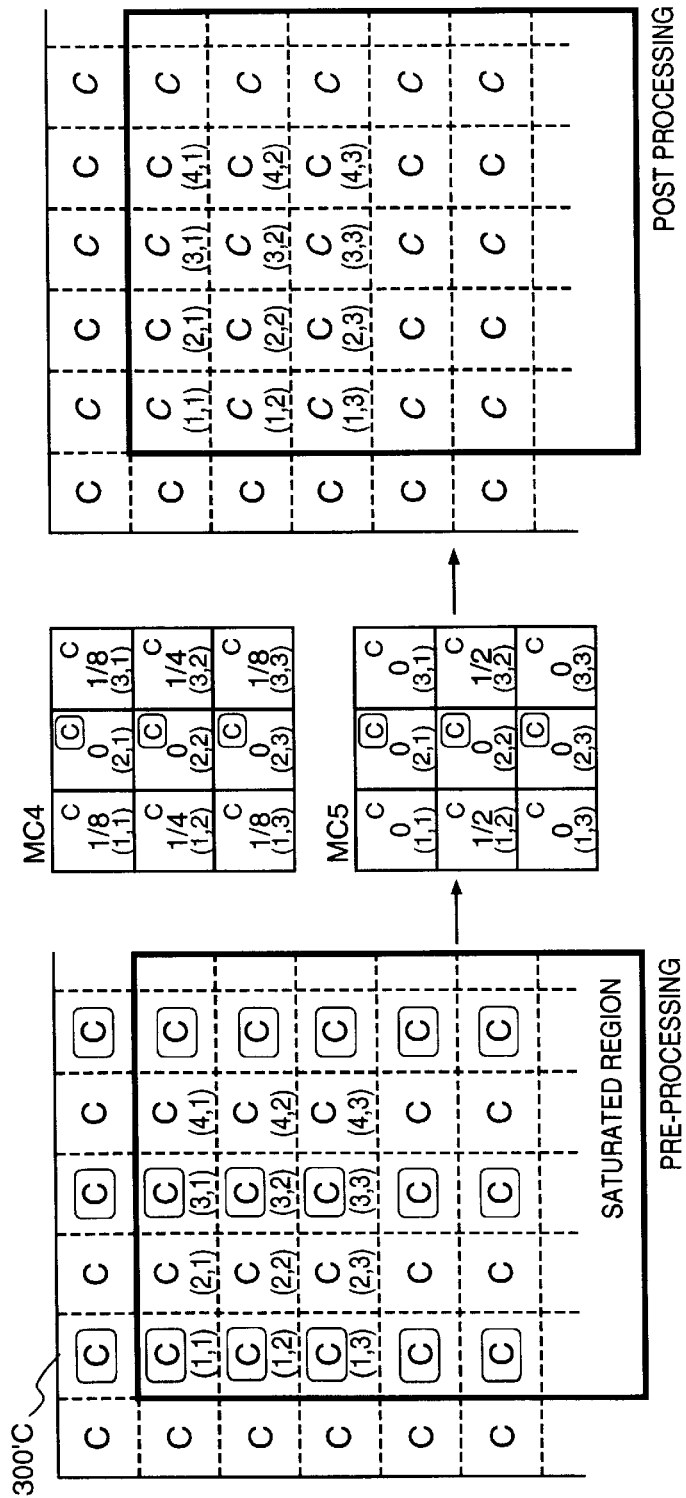

FIGS. 11 to 14 show the principle of the processing for broadening the dynamic range in the apparatus of this embodiment. In particular, FIG. 11 shows the principle of dynamic range broadening processing for a region including no saturated pixels in an M image, FIG. 12 shows the principle of dynamic range broadening processing for a region including no saturated pixels in a C image, FIG. 13 shows the principle of dynamic range broadening processing for a region including saturated pixels in an M image, and FIG. 14 shows the principle of dynamic range broadening processing for a region including saturated pixels in a C image. Upon execution of the processing shown in FIGS. 11 to 14, an image with a high resolution and a broad dynamic range can be generated.

Elimination of Saturation

The processing shown in FIGS. 11 to 14 will be briefly described below.

In the pixel-displacement operation, images sensed in different exposure conditions (normal and under exposures) are synthesized. For this purpose, the luminance levels of proper and improper exposure pixels must be matched with each other. Saturation occurs due to generation of saturated pixels. A saturated region of the pixels of an image obtained under a proper exposure is found, and is interpolated with the pixels of an image sensed under an improper (under) exposure. As the method of discriminating saturated and non-saturated regions, the apparatus of this embodiment uses the method described in "Method of Matching Luminance Levels in Units of Synthesized Images", U.S. Pat. Ser. No. (08/329,538) by the present applicant. Therefore, the disclosure of the U.S. patent application is incorporated hereto by reference.

Luminance Level Matching

In order to synthesize images to broaden the dynamic range, the luminance levels must be adjusted. In this embodiment, this luminance adjustment is called pre-processing. The pre-processed image data shown in FIGS. 11 and 12 are obtained by multiplying improper exposure pixels (under exposure) with a luminance level adjustment value K, so that their luminance levels match those of proper exposure pixels (normal exposure). This luminance level adjustment is also described in "Method of Matching Luminance Levels in units of Synthesized Images" cited above.

Figure 15:
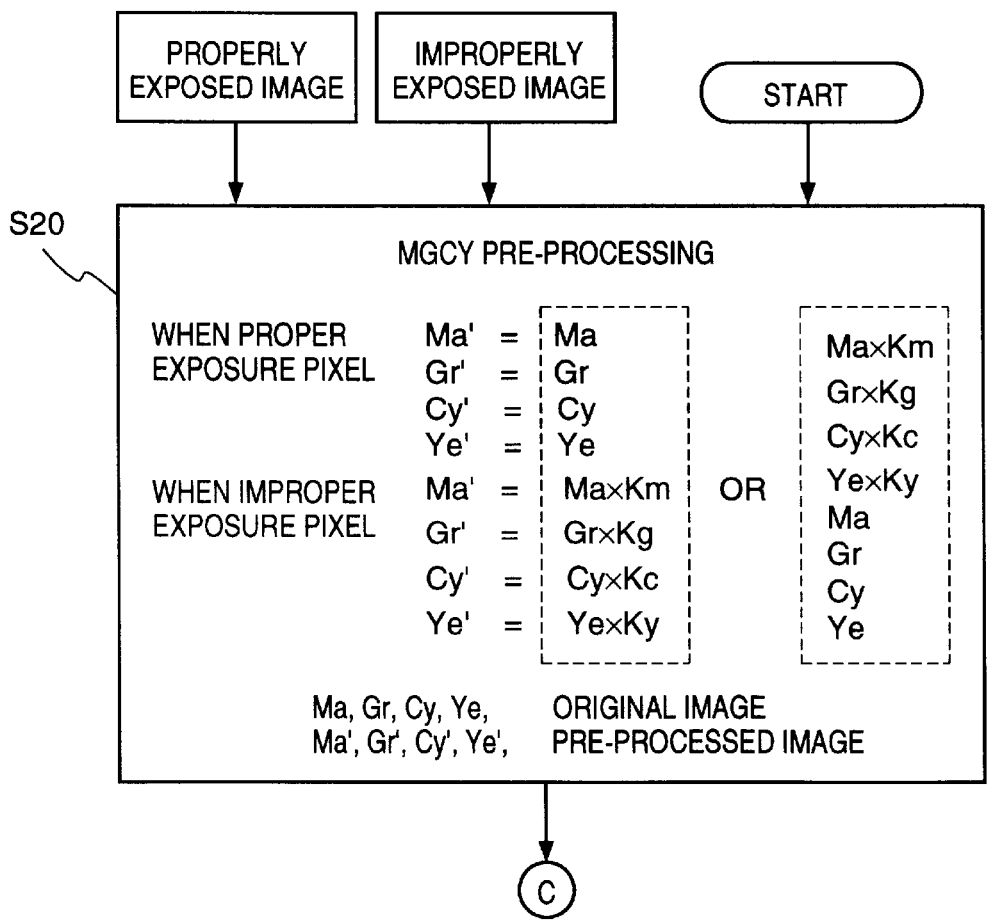
FIG. 15 is a partial flow chart of the control sequence of the first embodiment.

FIG. 15 shows the control sequence of the luminance level adjustment. FIG. 15 shows the contents of an inspection routine in step S15 in FIG. 9A. More specifically, if four image are obtained by executing pixel-displacement using a single exposure pattern, the "inspection" routine in step S15 (FIG. 9A) is executed to check if the exposure pattern is proper. If the exposure pattern is improper, "pixel-displacement" (steps S2 to S14) and "inspection" (step S15) are repeated until a proper exposure pattern is found.

In this pre-processing, of re-arranged image data (Ma, Gr, Cy, and Ye) shown in FIG. 8E or FIGS. 10A to 10D, all the image data obtained in an improper exposure are multiplied with correction coefficients Km, Kg, Kc, and Ky, so that the signal levels of these data match with those of image data obtained in a proper exposure.

The image data obtained after the pre-processing are arranged as indicated by 300M (for color M) in FIG. 11, 300C (for color C) in FIG. 12, 300M', (for color M) in FIG. 13, or 300° C. (for color C) in FIG. 14. In the region 300M, 300C, 300M', or 300C', Ms or Cs represent proper exposure pixels, Ms or Cs enclosed in circles (M̂ or Ĉ) represent improper exposure pixels, and Ms or Cs enclosed in rectangles (M̄, C̄) represent pixels subjected to the pre-processing (luminance level adjustment).

After the pre-processing, high-quality data for one image are generated based on the pre-processing image data. In this case, different processing operations are performed depending on the presence or absence of saturated pixels in images sensed in a proper exposure. More specifically, when saturated pixels are present, they are replaced by image data free from saturation, which are sensed in a different exposure amount, thereby providing the dynamic range broadening effect. Processing for regions with and without saturated pixels will be explained below.

Dynamic Range Broadening
··· Without Saturated Region

In this embodiment, the dynamic range broadening processing is performed using a 3×3 matrix filter. The function of this filter is a convolution. As shown in FIGS. 16A to 16F, this calculation gives, as the pixel value of a pixel of interest:

$$P = \frac{\sum D_{ij} f_{ij}}{\sum f_{ij}}$$

where summations are made for i, j=0, 1, 2, and D denotes the pixel value after the pre-processing, and f is a weighting coefficient of the filter. Note that, in pixels to be processed by the 3×3 filter, the positions of both properly and improperly exposed pixels are known. This is because the images with the distributions shown in FIGS. 10A to 10D are obtained as a result of, e.g., the pixel-displacement shown in FIG. 6. Therefore, the weighting coefficient of the filter processing given by the above equation can be set to be a value which places importance to or make light of the pixel value of a specific proper exposure pixel (or an improper exposure pixel) to obtain a target dynamic range.

FIG. 11 shows that three filters (MM1, MM2, and MM3) are applicable to a region of color M where no saturated pixels are present. FIG. 12 shows that three filters (MC1, MC2, and MC3) are applicable to a region of color C where no saturated pixels are present. FIG. 13 shows that three filters (MM4a, MM4b, and MM5) are applicable to a region of color M where saturated pixels are present. FIG. 14 shows that two filters (MC4 and MC5) are applicable to a region of color C where saturated pixels are present.

As for the filters for the region without saturated pixels, the filters MM1 and MC1 have the same arrangement. The filters MM2 and MC2 have the same arrangement. The filters MM3 and MC3 have the same arrangement. On the other hand, as for the filters for the region with saturated pixels, the filters MM5 and MC5 have the same arrangement. However, the arrangement of the filters MM4a is slightly different form the filters MM4b and MC4.

A user of the apparatus of this embodiment can designate a filter to be used.

The filter MM1 will be exemplified below. In this filter, only the coefficient at the position (2, 2) is "1", and other coefficients are zero. Therefore, the filter MM1 largely reflects the value of an improper exposure pixel at the position (2, 2) corresponding to the pixel of interest in a pixel value after the conversion processing. More specifically, the filter MM1 has an effect of directly using pre-processed image data in a region without saturated pixels. However, even when the filter MM1 is used for a proper exposure region, the luminance levels of proper and improper exposure pixels do not match with each other due to the setting values of the luminance level adjustment values Km and Kc or any other reasons, and flickering may occur. For this reason, in the apparatus of this embodiment, the filter MM2 or MM3 (MC2 or MC3) other than the filter MM1 (or MC1) can be selected. For example, in the filter MM3 (or MC3), the pixel value of an improperly exposed pixel at the central position has a weighting coefficient of ½, and the pixel values of two neighboring properly exposed pixels have weighting coefficients of ¼. Therefore, since the filters MM2, MM3, MC2, and MC3 serve as low-pass filters for lowering the resolution, flickering can be suppressed.

As described above, in this apparatus, by adjusting the values of convolution operators, the luminance level can be adjusted variously. For this reason, the balance between the degree of broadening of the dynamic range and the degree of improvement of the resolution can be adjusted.

Dynamic Range Broadening
··· With Saturated Region

The processing method used when a saturated region is present will be described below with reference to FIGS. 13 and 14. Referring to FIGS. 13 and 14, assume that a hatched region is saturated under a proper exposure, and is not saturated under an improper exposure. The case of magenta M will be exemplified below. In FIG. 13, since the pixel (pixel of interest) at the coordinate position (3, 3) is saturated, its value cannot be directly used. Thus, this pixel value is corrected by a pixel which is located in the vicinity of the pixel of interest, and is obtained under an improper exposure free from saturation. This correction processing is attained by the convolution calculation as in the processing for a non-saturated region (FIGS. 11 and 12), and the balance between the degree of broadening of the dynamic range and the degree of improvement of the resolution can be adjusted by changing the values of the convolution operators. For example, in FIG. 13, since the pixel (pixel of interest) at the position (3, 3) is saturated, a filter coefficient corresponding to this pixel of interest should be set to be "0". Although the pixel of interest at the position (3, 3) is saturated, the filter coefficients for a plurality of pixels (e.g., pixels at the positions (2, 2), (2, 3), (4, 3), and (3, 4)) which are located in the vicinity of the pixel of interest and are not saturated are set to be a value other than "0", e.g., ⅛ or ¼. As an example of a filter with such characteristics, FIG. 13 shows the filter MM4a. For a saturated pixel of interest at the position (3, 2), the filter MM4b having a different distribution of filter coefficients from that of the filter MM4a is used.

Various appropriate filters can be selectively used for the saturated pixel of interest since the positions of non-saturated pixels are known.

When the convolution operator of this filter MM4B is used, the resolution is lowered. For this reason, in order to maintain a predetermined vertical resolution, the filter MM5 may be used. In this manner, the convolution operator is determined to obtain optimal image quality.

For cyan shown in FIG. 14, the same processing as that for magenta is performed. The features of the convolution operators MC1 to MC5 will be explained below. The convolution operator MC1 has no effect. The operator MC2 provides a light low-pass processing effect to adjust the luminance level. The operator MC3 provides a low-pass processing effect lighter than MC2. The operator MC4 is used for a calculation from non-saturated pixels. The operator MC5 has a resolution higher than that of MC4.

FIGS. 16A to 16F and FIGS. 17A to 17E show the filters used in the apparatus of this embodiment.

Control Sequence of Dynamic Range Broadening

Figure 18:
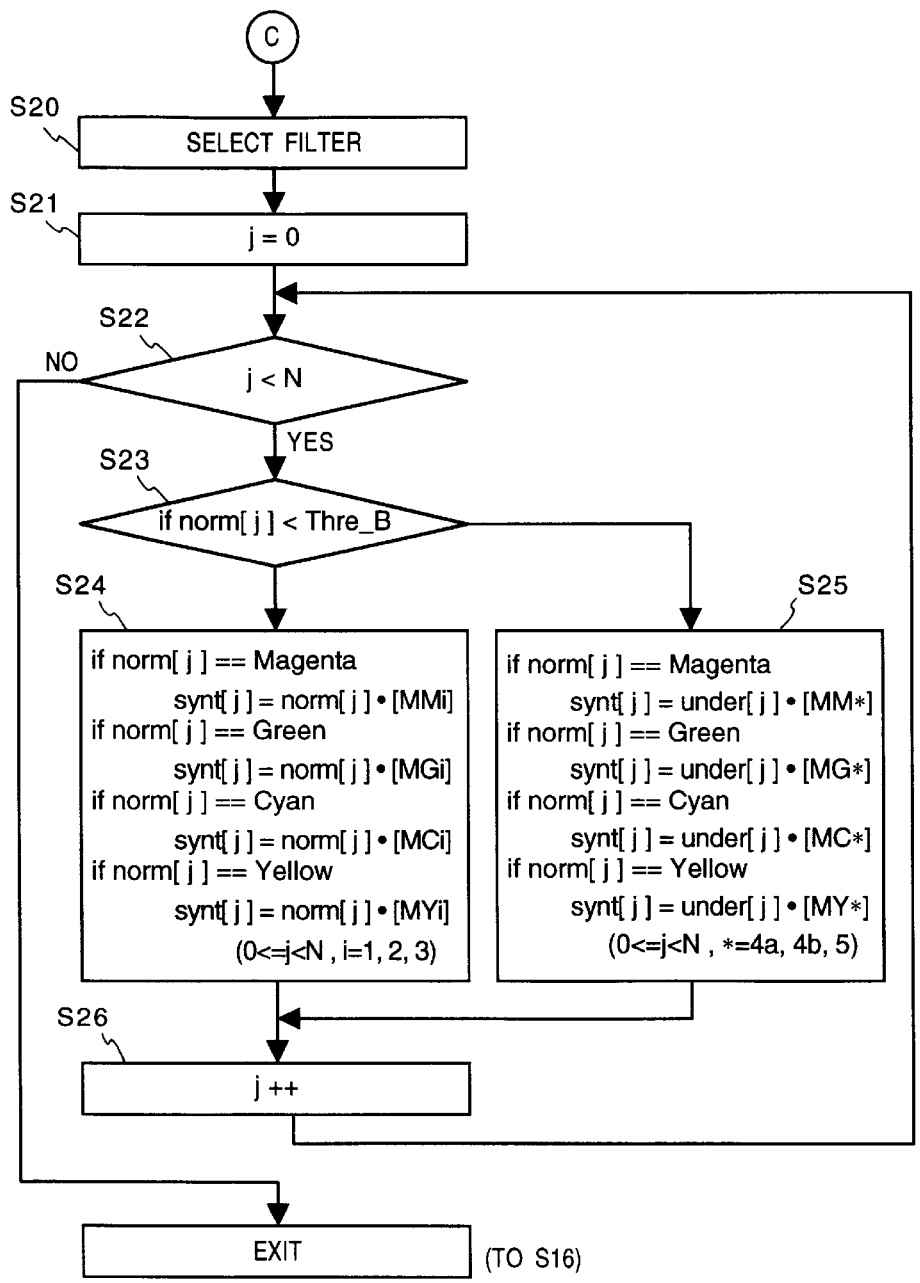
FIGS. 18 and 19 are partial flow charts of the control sequence of the first embodiment.

FIG. 18 is a flow chart showing the control sequence for broadening the dynamic range by interpolating an image suffering a saturated region, i.e., the control sequence for realizing the processing shown in FIGS. 11 to 14.

In step S20, a user is allowed to select a filter. The user selects filter characteristics by operating a switch (not shown; provided to the image sensing apparatus). The controller detects the user's intention by detecting the operated switch position. In step S21, a counter j indicating the pixel position is set to be an initial value. In step S22, it is checked if convolution processing is executed for all the number of pixels (=N). It is checked in step S23 if an image signal norm[1] obtained in a proper exposure is a saturated pixel by discriminating if norm[j]<Thre-B (where Thre-B is a threshold value for saturation discrimination). If the signal norm[1] is not saturated, a convolution calculation using MMi if norm[1] is magenta, MGi if norm[1] is green, MCi if norm[1] is cyan, or MYi if norm[1] is yellow is applied to a pixel under[j] in an under exposure, thus generating a synthesized signal synt[j]. Note that i is the suffix indicating the type of the filter, and indicates the filter selected by the user in step S20.

If it is determined in step S23 that the signal norm[1] is a saturated pixel, a convolution calculation using MM4*, MG4*, MC4*, or MY4* is performed for a magenta, green, cyan, or yellow signal under[j], thus generating a synthesized signal synt[j]. Note that * is the suffix indicating the type of the filter, and indicates the filter selected by the user in step S20.

In step S26, the counter j is incremented, and the flow returns to step S22 to repeat the processing in step S24 or S25.

Figure 19:
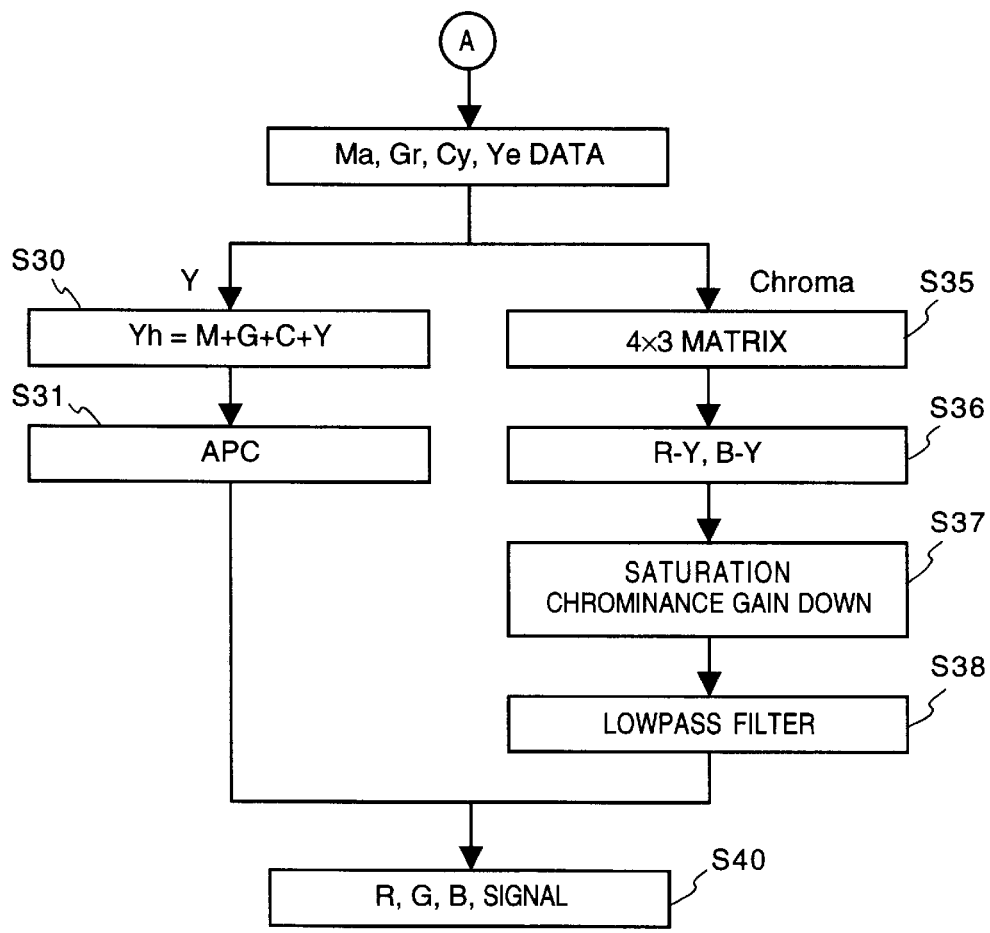

If the processing is completed for all the pixels, the control enters the control sequence shown in FIG. 19, and R, G, and B signals are generated on the basis of the synthesized image signals.

The control sequence in FIG. 19 will be described below.

The R, G, and B signals are generated based on the Ma, Gr, Cy, and Ye luminance components Y and the chroma component. Thus, since synthesized signals Ma, Gr, Cy, and Ye generated in the control sequence in FIG. 18 in correspondence with a single pixel include luminance signal components, a luminance component Yh is calculated based on:

$$Yh = M + G + C + Y$$

In step S31, edge emphasis is performed. On the other hand, as for the chroma component, in order to convert complementary color signals (M, G, C, and Y) into pure color signals (R, G, and B), 4×3 matrix processing is executed in step S35, and color difference signals (R-Y and B-Y) are generated in step S36. In step S37, saturation chrominance gain down processing is performed for the color difference signals. In step S38, the color difference signals are subjected to low-pass filter processing.

Finally, the luminance signal Yh and the color difference signals R-Y and B-Y are synthesized in step S40, thus generating R, G, and B signals.

The above-mentioned processing is executed for all the pixels and all the signals M, G, Y, and C. The processed four image data are supplied to the signal processing unit 8 in FIG. 3, and are converted into R, G, and B signals and a Y signal. Thereafter, these signals are output.

Change Exposure Pattern

If it is determined in step S16 in FIG. 9A that the exposure pattern is improper, another pattern is selected in step S2, and the pixel-displacement processing in steps S3 to S14 is executed using the new exposure pattern.

Assume that an exposure pattern 200 (normal→over→over→normal) is selected in turn. This exposure pattern is effective for a case wherein the object image includes a dark region.

Dynamic Range Broadening ··· With Dark Region

Processing for eliminating dark in a dark region in image data sensed in a proper exposure will be explained below.

Figure 20:
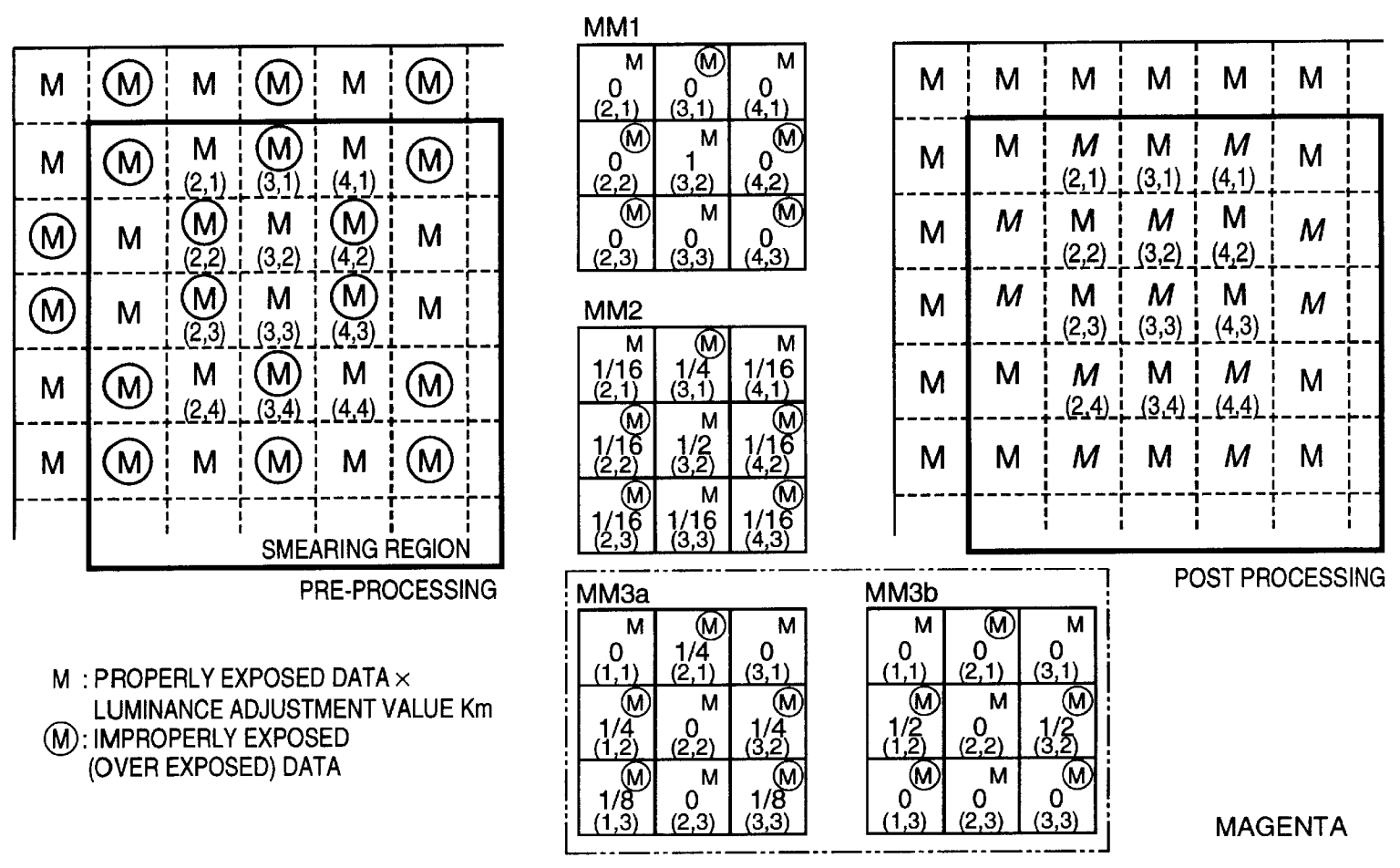
Figure 21:
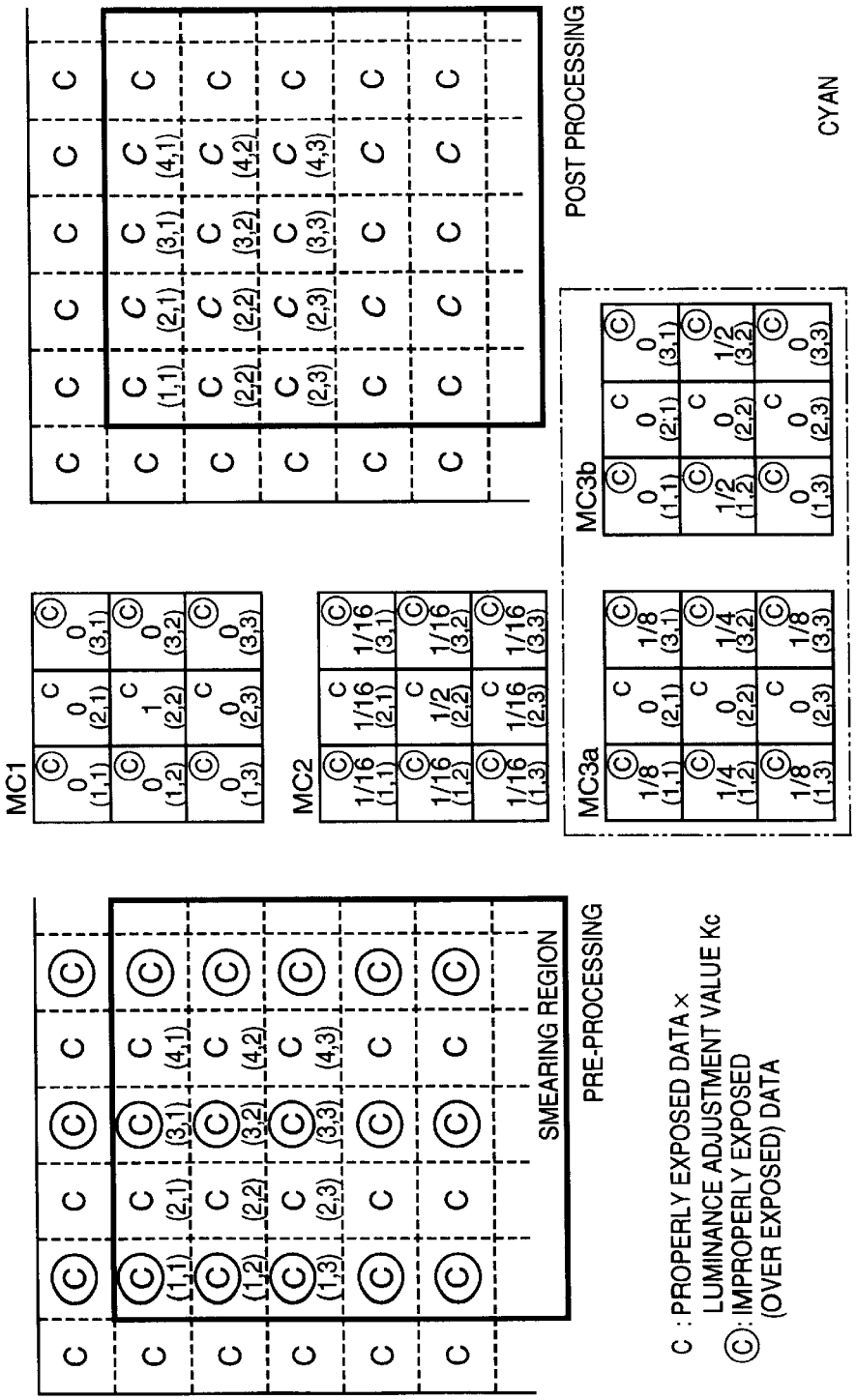

Since the sensing order of the pattern 200 including over exposures is substantially the same as that of the pattern 100 including under exposures, images, as shown in FIGS. 10A to 10D, are obtained by re-arranging four images sensed using the exposure pattern 200. FIG. 20 shows a magenta image of these images, and FIG. 21 shows a cyan image. In FIGS. 20 and 21, M or C enclosed in circles (Ⓜ or Ⓒ) indicate pixels sensed in an over exposure unlike in FIGS. 11 to 14.

Luminance level adjustment will be described below with reference to FIGS. 20 and 21. In the above-mentioned luminance level adjustment for interpolating saturated pixels, an improper exposure image (i.e., an image sensed in an under exposure) is multiplied with the gain adjustment value. In the case of darkening, a proper exposure image is multiplied with a gain adjustment value K to adjust the luminance level of the proper exposure image to that of an improper exposure image. Since an improper exposure image in this case is obtained in an over exposure, it has a larger pixel value than a proper exposure image. Data subjected to this adjustment processing corresponds to data indicated by "pre-processing" in FIG. 20 or 21.

Processing for a magenta image will be described first. After the pre-processing, one of the convolution operators MM1 and MM2 is applied to a region free from darkening, and one of the operators MM3a and MM3b is applied to a dark region, thus synthesizing images. The feature of the filters MM3a and MM3b is to interpolate dark pixels in a proper exposure image by an improper exposure image (pixels sensed in an over exposure). The balance between the degree of broadening of the dynamic range and the degree of improvement of the resolution can be adjusted by the values of the convolution operators.

The same applies to cyan, and the processing shown in FIG. 21 is performed.

The above-mentioned processing is executed for all the pixels and all the signals M, G, Y, and C. The processed four image data are supplied to the signal processing unit 8 in FIG. 3, and are converted into R, G, and B signals and a Y signal. Thereafter, these signals are output.

Control Sequence for Dark Region

Figure 22:
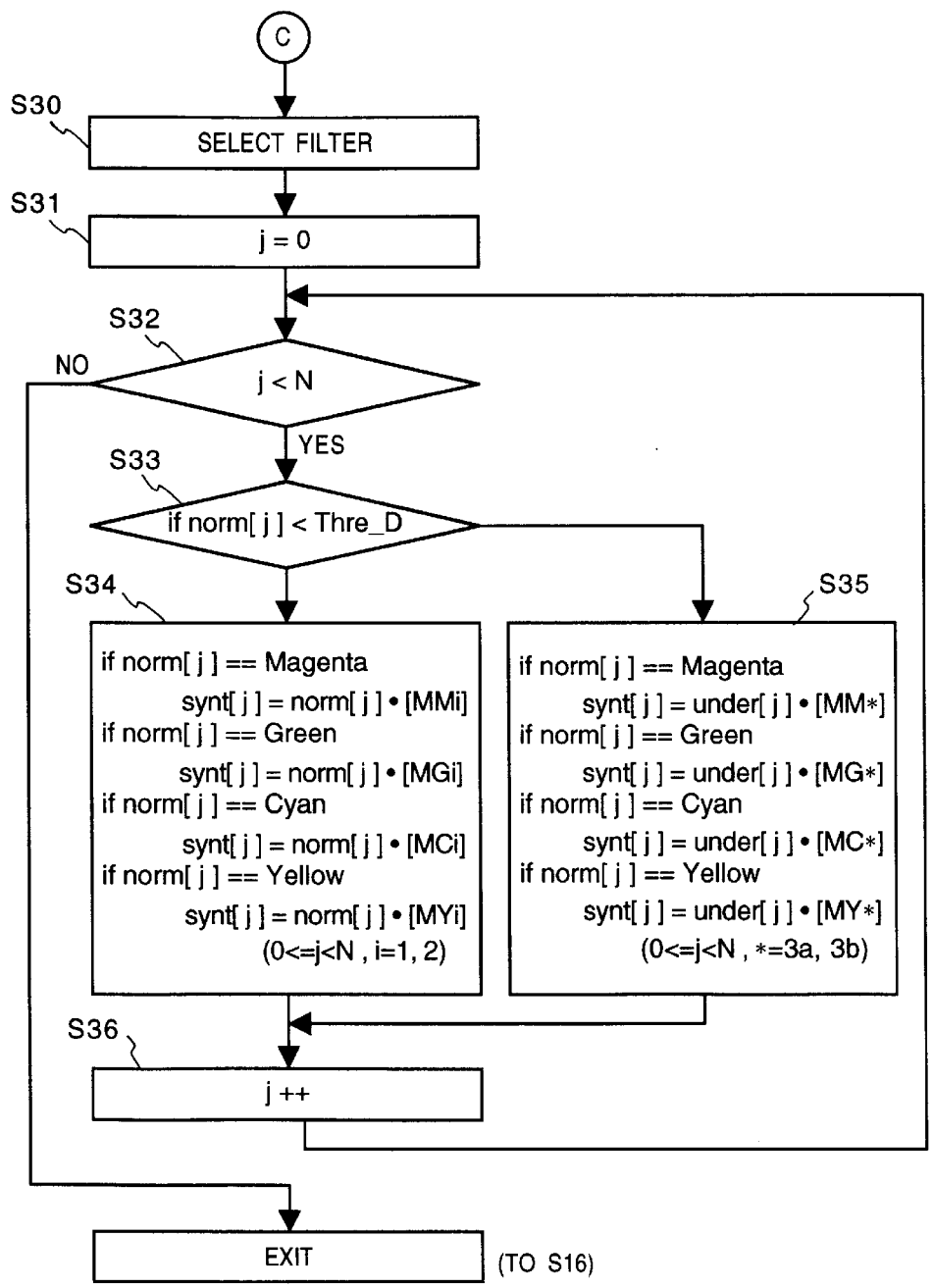
FIG. 22 is a partial flow chart of the control sequence of the first embodiment.

FIG. 22 shows the control sequence of the controller for a case wherein dark pixels are present, and corresponds to part of step S15 in FIG. 9A. The control sequence in FIG. 22 also corresponds to that (FIG. 18) for a case wherein saturated pixels are present.

In step S33, it is checked if the pixel of a proper exposure image signal norm[1] after the pre-processing is a dark pixel. If the proper exposure image signal norm[1] as an object to be processed is not a dark pixel, a convolution calculation using MM1 if norm[1] is magenta, MG1 if norm[1] is green, MC1 if norm[1] is cyan, or MY1 if norm[1] is yellow is performed. More specifically, if the pixel norm[1] as an object to be processed is not a dark pixel, the convolution calculation is performed while placing importance to the pixel value of normal[1]. Note that the convolution operator can be selected in step S30 (e.g., MM1 or MM2 for magenta).

If it is determined in step S33 that the pixel norm[1] is a dark pixel, a convolution calculation is performed using MM3a (or MM3b), MG3a (or MG3b), MC3a (or MC3b), or MY3a (or MY3b) in correspondence with magenta, green, cyan, or yellow.

Note that the convolution operator for a dark pixel can be selected in step S30.

Advantages of First Embodiment

As described above, according to the above embodiment, the following effects can be obtained.

1̂: A plurality of image sensing operations are performed in different exposure amounts while performing pixel-displacement. More specifically, the pixel-displacement processing can assure a high resolution, and a single image with a broad dynamic range is synthesized using a plurality of image data sensed in different exposure amounts. Thus, a broad dynamic range can be attained at the same time. The two effects are achieved at the same time since, in a plurality of images obtained by a plurality of image sensing operations in different exposure amounts while executing the pixel-displacement processing, the positions of saturated pixels or noise pixels cannot be predicted, but the positions and exposure amounts of pixels are known in advance.

2: Since the exposure amount is switched between under and over exposure amounts, saturated and dark pixels can be interpolated.

3: The filter characteristics can be selected.

4: The exposure pattern can be switched depending on the object in question.

Modification for First Embodiment

In the above embodiment, an image obtained from an object includes only a combination of normal pixels and saturated pixels or a combination of normal pixels and noise pixels (darkening). However, in an actual image, normal pixels, saturated pixels, and noise pixels are often mixed together. In this case, in step S2 in FIG. 9A, an exposure pattern 300 is selected. This exposure pattern switches the exposure amount like normal→under→over→normal. Upon synthesis of images obtained by this exposure pattern, images shown in FIGS. 23A (magenta), 23B (green), 23C (cyan), and 23D (yellow) are obtained.

Figure 23A:
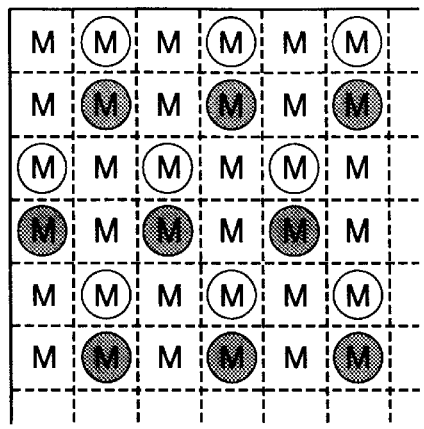
FIGS. 23A to 23D are views for explaining the principle of dynamic range broadening processing according to a modification of the first embodiment.
Figure 23B:
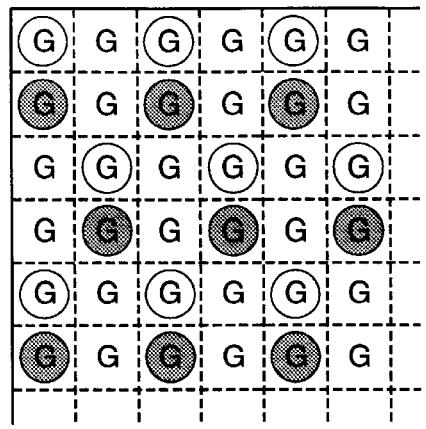
Figure 23C:
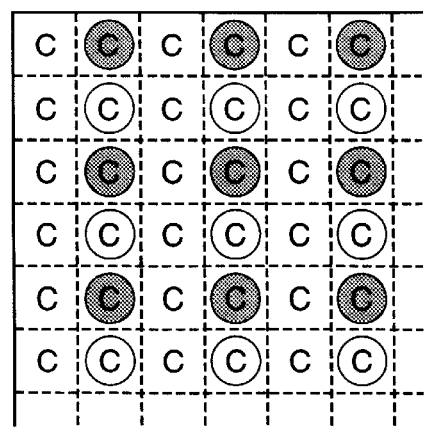
Figure 23D:
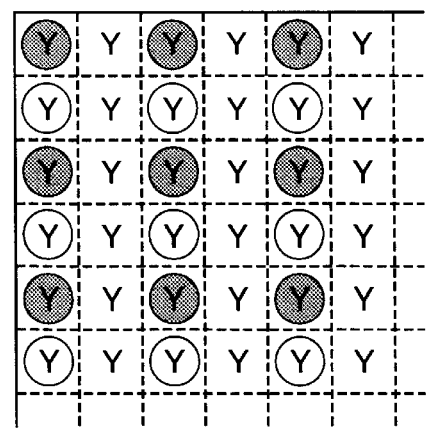

As in the above embodiment, in the images shown in FIGS. 23A (magenta), 23B (green), 23C (cyan), and 23D (yellow) as well, the positions of proper exposure pixels, under exposure pixels, and over exposure pixels are known. Therefore, a saturated pixel can be interpolated on the basis of under exposure pixels near the pixel, and a dark (noise) pixel can be interpolated on the basis of over exposure pixels near the pixel.

Furthermore, a modification of pixel-displacement will be described below. In the first embodiment, the displacement pattern shown in FIG. 6 is used. Alternatively, pixel-displacement patterns shown in FIGS. 24A to 24C may be used.

Figure 24A:
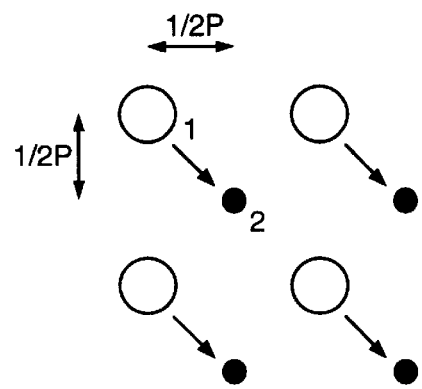
FIGS. 24A to 24C are views for explaining modifications of pixel-displacement patterns of the first embodiment.

In the pixel-displacement pattern shown in FIG. 24A, pixels are displaced by half the pitch (½P) in an oblique direction. In this pixel-displacement pattern, since an image is sensed at two positions, two images can be obtained.

Figure 24B:
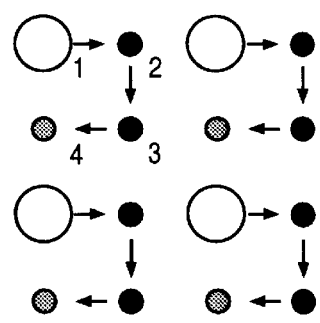

In the pixel-displacement pattern shown in FIG. 24B, the direction of displacement coincides with that in FIG. 6, but the displacement amount is half the pitch. In this pixel-displacement pattern, since an image is sensed at four positions, four images can be obtained.

Figure 24C:
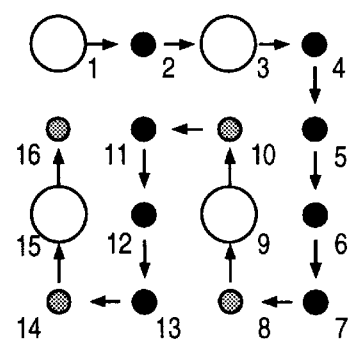

In the pixel-displacement pattern shown in FIG. 24C, pixels displace to 16 different positions in turn. In this pixel-displacement pattern, since an image is sensed at 16 positions, 16 images can be obtained.

Second Embodiment

FIG. 25 is a schematic block diagram of an image sensing apparatus according to the second embodiment of the present invention. This apparatus is divided into an image sensing block and a high-quality conversion processing block, as shown in FIG. 25. In the image sensing apparatus of this embodiment, the image sensing block of the image sensing apparatus of the first embodiment shown in FIG. 3 is replaced by a multi-plate type image sensing block. Referring to FIG. 25, reference numerals 11, 12, and 13 denote image sensing devices; 14, 15, and 16, A/D converters; and 10, a prism.

The operation will be described below. An object image (not shown) is transmitted through a lens 1, and is split into three optical paths by the prism 10. These split beams are projected onto the image sensing devices 11 to 13, and signals output from the devices 11 to 13 are converted into digital signals by the A/D converters 14 to 16. As in the first embodiment, when no high-quality conversion processing such as a movie operation is performed, a system controller 9 immediately supplies these signals to a signal processing unit 8. These signals are converted into R, G, B, and Y signals, and the converted signals are output.

When high-quality conversion processing is performed, the system controller 9 obtains three image signals for a single scene in different exposure amount by changing the exposure amounts of the image sensing devices using exposure changing means such as an ND filter or an electronic shutter. These image signals are supplied to a memory 6, and are then subjected to dynamic range broadening processing in a high-quality conversion processing unit 7. Thereafter, these signals are converted into R, G, B, and Y signals by the signal processing unit, and the converted signals are output. At this time, the processing algorithm in the high-quality conversion processing unit is the same as that in the first embodiment.

In the image sensing apparatus with the arrangement of this embodiment, since three images are obtained in a single image sensing operation, the pixel-displacement effect and the dynamic range broadening effect can be obtained, and an image with a high resolution and a broad dynamic range in the first embodiment can be easily realized.

Third Embodiment

Figure 26:
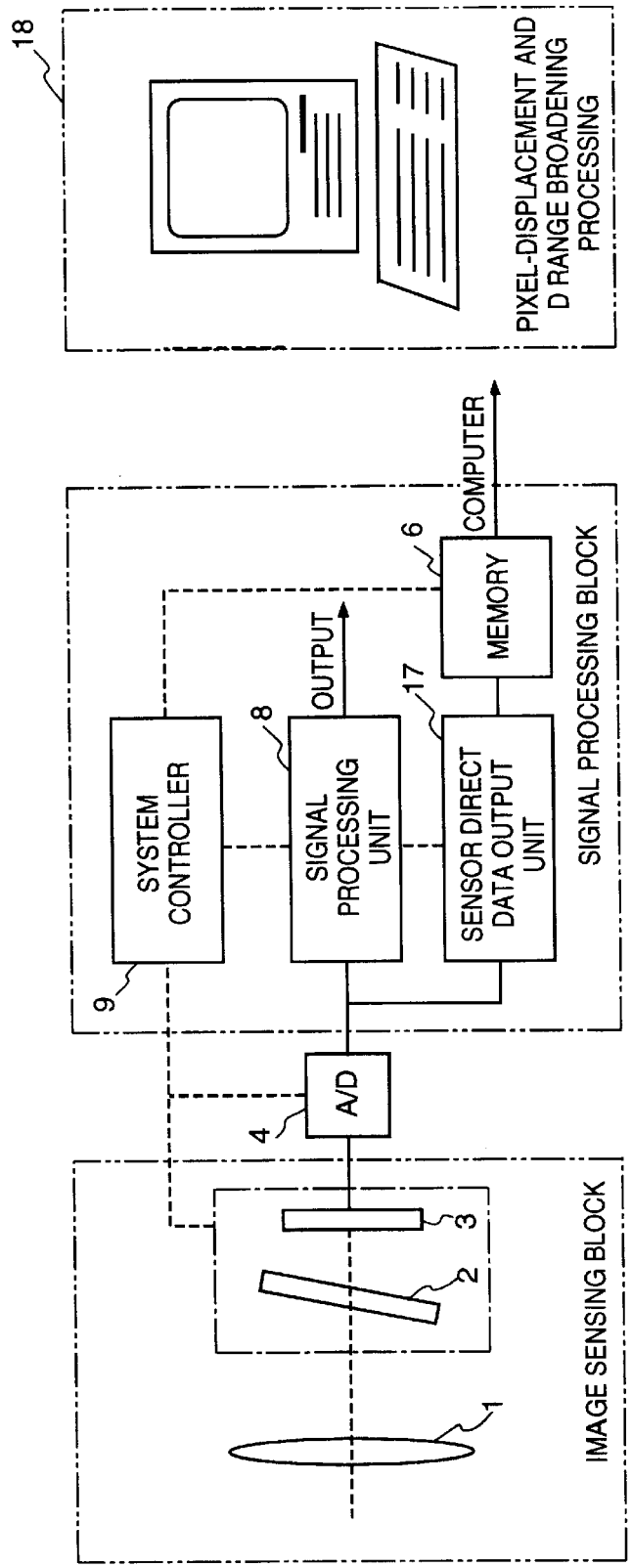
FIG. 26 is a block diagram showing the third embodiment of the present invention.

FIG. 26 is a schematic block diagram of an image sensing apparatus according to the third embodiment of the present invention. This apparatus is divided into an image sensing block and a signal processing block. Unlike in the first embodiment, an image sensing device 3 directly outputs binary data in the image sensing apparatus of this embodiment. At this time, the characteristic feature of this embodiment is to add, to binary data, a luminance level adjustment value, pixel-displacement information, and exposure condition information, i.e., high-quality conversion information required for high-quality conversion processing.

Referring to FIG. 26, reference numeral 17 denotes a sensor direct data output unit; and 18, a computer such as a personal computer.

The operation of this embodiment will be described below. When no high-quality conversion operation is performed, a system controller 9 supplies an image signal obtained by the image sensing block to a signal processing unit 8. The image signal is converted into R, G, B, and Y signals, and these converted signals are output. When a high-quality conversion operation is performed, the image signal is supplied to the sensor direct data output unit 17, and is converted into a format which allows data transfer to the computer 18. Thereafter, the converted data is stored in the memory 6. At the same time, the above-mentioned high-quality conversion information is added to the data. The data stored in the memory 6 is supplied to the computer 18 upon request from a user, and is subjected to the same processing as in the first embodiment.

With the arrangement of this embodiment, the image sensing apparatus need not comprise a microcomputer with a high signal processing speed unlike in the first embodiment, and the circuit arrangement can be simplified. Since the high-quality conversion processing function is provided to the computer 18, the algorithm can be easily changed by a user's request.

Fourth Embodiment

In the above embodiments, as means for inputting a plurality of images which are formed based on a single object image and are displaced from each other, means such as an image sensing device for converting an optical image into an electrical signal is used. However, the input means of the present invention is not limited to this. For example, a plurality of images which are formed based on a single object image and are displaced from each other (these images are sensed, so that the exposure amount of at least one of these images is different from those of other images) are recorded on an image recording apparatus (for example, images are recorded on different tracks in units of images in a disk apparatus). Such a recording apparatus is considered as input means. Then, the image recording apparatus is connected to a system shown in FIG. 27.

Figure 27:
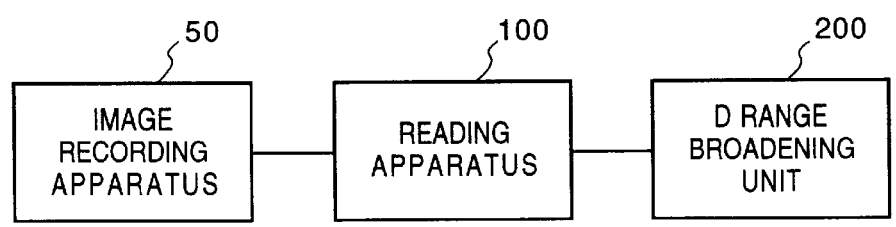
FIG. 27 is a block diagram showing the arrangement according to the fourth embodiment of the present invention.

The system shown in FIG. 27 includes an image recording apparatus 50, an image reading apparatus (reproduction apparatus) 100, and a unit 200 for executing "dynamic range broadening processing" described in the first to third embodiments. The reading apparatus 100 performs an image reading operation from the recording apparatus 50 on the basis of an instruction from the unit 200. The unit 200 executes the above-mentioned dynamic range broadening processing. According to this system, an image which can assure a high resolution and a broad dynamic range can be generated on the basis of already recorded images.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
an image sensing device which has a predetermined number of pixels and senses an object to obtain an image signal;
displacing means for displacing a relative position between an optical image of an object and said image sensing device during an image sensing operation by said image sensing device; displacement control means for controlling said displacing means to perform a sequence of displacement operations, each displacement operation being accompanied by an image sensing operation for the object; and
exposure control means for, in synchronism with each displacement operation and image sensing operation, controlling an exposure of said image sensing means so that an exposure in at least one image sensing operation be a different exposure amount from those in other image sensing operations of the sequence of displacement operations.

2. The apparatus according to claim 1, further comprising:
image processing means for generating a single image on the basis of a sequence of images obtained under a control of said control means.

3. The apparatus according to claim 2, wherein said image processing means obtains an image with a high resolution and a broad dynamic range by executing predetermined processing for pixel data at a predetermined position in the sequence of images on the basis of information associated with directions and distances of the displacing operations performed for the images by said displacing means, and information associated with exposure amounts of the images.

4. The apparatus according to claim 2, wherein said control means performs an image sensing operation in a proper exposure amount and an image sensing operation in an under exposure amount, and said image processing means synthesizes a saturated region pixel in a standard image sensed in the proper exposure amount using pixels in the vicinity of the saturated region pixel in a non-standard image sensed in the under exposure amount.

5. The apparatus according to claim 4, wherein the pixels in the vicinity of the saturated region pixel are determined on the basis of the direction and distance of the displacing operation executed by said displacing means for the corresponding image.

6. The apparatus according to claim 2, wherein said control means performs an image sensing operation in a proper exposure amount and an image sensing operation in an over exposure amount, and said image processing means synthesizes a dark region pixel in a standard image sensed in the proper exposure amount using pixels in the vicinity of the dark region pixel in a non-standard image sensed in the over exposure amount.

7. The apparatus according to claim 6, wherein the pixels in the vicinity of the dark region pixel are determined on the basis of the direction and distance of the displacing operation executed by said displacing means for the corresponding image.

8. The apparatus according to claim 2, wherein said control means performs an image sensing operation in an over exposure amount and an image sensing operation in an under exposure amount, and said image processing means synthesizes a saturated region pixel in a non-standard image sensed in the over exposure amount using pixels in the vicinity of the saturated region pixel in a non-standard image sensed in the under exposure amount and synthesizes a dark region pixel in a non-standard image sensed in the under exposure amount using pixels in the vicinity of the saturated region pixel in a non-standard image sensed in the over exposure amount.

9. The apparatus according to claim 8, wherein the pixels in the vicinity of the saturated and dark region pixels are determined on the basis of the direction and distance of the displacing operation executed by said displacing means for the corresponding image.

10. The apparatus according to claim 4, wherein, in synthesizing processing by said image processing means, a ratio between a degree of improvement of a resolution and a degree of broadening of a dynamic range is changed by changing a ratio of mixing of a pixel of interest to be synthesized in either one of the standard image and the non-standard image, with pixels in the vicinity of the pixel of interest in the non-standard image.

11. The apparatus according to claim 6, wherein, in synthesizing processing by said image processing means, a ratio between a degree of improvement of a resolution and a degree of broadening of a dynamic range is changed by changing a ratio of mixing of a pixel of interest to be synthesized in either one of the standard image and the non-standard image, with pixels in the vicinity of the pixel of interest in the non-standard image.

12. The apparatus according to claim 8, wherein, in synthesizing processing by said image processing means, a ratio between a degree of improvement of a resolution and a degree of broadening of a dynamic range is changed by changing a ratio of mixing of a pixel of interest to be synthesized in either one of the standard image and the non-standard image, with pixels in the vicinity of the pixel of interest in the non-standard image.

13. The apparatus according to claim 1, wherein said control means comprises an electronic shutter for said image sensing device so as to control an exposure amount of said image sensing device.

14. The apparatus according to claim 1, wherein said control means comprises optically correcting means, arranged in front of said image sensing device, for controlling an exposure amount of said image sensing device.

15. The apparatus according to claim 2, wherein said displacing means moves means which fixes said image sensing device each time the object is sensed.

16. The apparatus according to claim 1, wherein said displacing means comprises optically correcting means, located between the object and said image sensing device, for displacing an optical axis of an optical image of the object each time the object is sensed.

17. The apparatus according to claim 2, wherein said image processing means comprises a plurality of filters, which can be selected.

18. The apparatus according to claim 1, further comprising detection means for detecting if the image obtained by said image sensing device includes a saturated pixel or a noise pixel, and wherein said displacing means pre-stores a plurality of different patterns of displacing operations, and said control means senses a sequence of images again by selecting the pattern of the displacing operation corresponding to the detection result of said detection means.

19. An image sensing apparatus comprising:
a plurality of image sensing devices each of which has a predetermined number of pixels and senses an object to obtain an image signal, and which are displaced from each other by a predetermined distance in a direction perpendicular to an optical axis;
displacement control means for sequentially changing over said plurality of image sensing devices so that said plurality of image sensing devices sequentially sense the object to obtain a sequence of displaced images of the object; and
exposure control means for, in synchronism with each changing-over operation of said plurality of image sensing devices, controlling an exposure of at least one of said image sensing devices to be a different image sensing exposure amount from those of the other image sensing devices.

20. The apparatus according to claim 19, further comprising:
image processing means for generating a single image on the basis of a sequence of images.

21. The apparatus according to claim 20, wherein said image processing means obtains an image with a high resolution and a broad dynamic range by executing predetermined processing for pixel data at a predetermined position in the sequence of images on the basis of information associated with displacement directions and distances of the image sensing devices, and information associated with exposure amounts of the images.

22. The apparatus according to claim 20, wherein said control means performs an image sensing operation in a proper exposure amount and an image sensing operation in an under exposure amount, and said image processing means synthesizes a saturated region pixel in a standard image sensed in the proper exposure amount using pixels in the vicinity of the saturated region pixel in a non-standard image sensed in the under exposure amount.

23. The apparatus according to claim 22, wherein the pixels in the vicinity of the saturated region pixel are determined on the basis of the displacement amount and direction of the corresponding image sensing device.

24. The apparatus according to claim 20, wherein said control means performs an image sensing operation in a proper exposure amount and an image sensing operation in an over exposure amount, and said image processing means synthesizes a dark region pixel in a standard image sensed in the proper exposure amount using pixels in the vicinity of the dark region pixel in a non-standard image sensed in the over exposure amount.

25. The apparatus according to claim 24, wherein the pixels in the vicinity of the dark region pixel are determined on the basis of the displacement direction and distance of the corresponding image sensing device.

26. The apparatus according to claim 20, wherein said control means performs an image sensing operation in an over exposure amount and an image sensing operation in an under exposure amount, and said image processing means synthesizes a saturated region pixel in a non-standard image sensed in the over exposure amount using pixels in the vicinity of the saturated region pixel in a non-standard image sensed in the under exposure amount and synthesizes a dark region pixel in a non-standard image sensed in the under exposure amount using pixels in the vicinity of the saturated region pixel in a non-standard image sensed in the over exposure amount.

27. The apparatus according to claim 26, wherein the pixels in the vicinity of the dark and saturated region pixels are determined on the basis of the displacement direction and distance of the corresponding image sensing device.

28. The apparatus according to claim 22, wherein, in the synthesizing processing by said image processing means, a ratio between a degree of improvement of a resolution and a degree of broadening of a dynamic range is changed by changing a ratio of mixing of a pixel of interest to be synthesized in either one of the standard image and the non-standard image, with pixels in the vicinity of the pixel of interest in the non-standard image.

29. The apparatus according to claim 24, wherein, in the synthesizing processing by said image processing means, a ratio between a degree of improvement of a resolution and a degree of broadening of a dynamic range is changed by changing a ratio of mixing of a pixel of interest to be synthesized in either one of the standard image and the non-standard image, with pixels in the vicinity of the pixel of interest in the non-standard image.

30. The apparatus according to claim 26, wherein, in the synthesizing processing by said image processing means, a ratio between a degree of improvement of a resolution and a degree of broadening of a dynamic range is changed by changing a ratio of mixing of a pixel of interest to be synthesized in either one of the standard image and the non-standard image, with pixels in the vicinity of the pixel of interest in the non-standard image.

31. The apparatus according to claim 19, wherein said control means comprises an electronic shutter for said image sensing device so as to control an exposure amount of said image sensing device.

32. The apparatus according to claim 19, wherein said control means comprises optically correcting means, arranged in front of said image sensing device, for controlling an exposure amount of said image sensing device.

33. The apparatus according to claim 20, wherein said image processing means comprises a plurality of filters, which can be selected.

34. An image processing method for sensing a single object by image sensing means to obtain a sequence of images, and generating an image with a high resolution and a broad dynamic range by processing the sequence of images, comprising the steps of:
sequentially acquiring a sequence of the images of the object which are displaced from each other by a predetermined distance in a predetermined direction, via said image sensing means, while an exposure for at least one of the sequence of images being set to be different from those of other images in synchronism with the acquiring of the sequence of images which are displaced from each other; and generating an image with a high resolution and a broad dynamic range by executing predetermined processing for pixel data at a predetermined position in the sequence of images on the basis of information associated with displacement directions and distances of the corresponding images, and information associated with exposure amounts of the images.

35. The method according to claim 34, wherein the acquisition step includes the step of performing an image sensing operation in a proper exposure amount and an image sensing operation in an under exposure amount.

36. The method according to claim 34, wherein the acquisition step includes the step of performing an image sensing operation in a proper exposure amount and an image sensing operation in an over exposure amount.

37. The method according to claim 34, wherein the pixel at the predetermined position is determined on the basis of the displacement direction and distance of the corresponding image.

38. The method according to claim 34, wherein the acquisition step includes the step of changing over change patterns of the exposure amounts.

39. An image sensing apparatus comprising:

image sensing means for sensing a sequence of images of a single object, said sequence of images being displaced from each other by a predetermined distance in a predetermined direction; and control means for, in synchronism with each displacement operation of said image sensing means, setting an exposure amount for at least one of said sequence of images to be different from exposure amounts for other images upon formation of the sequence of images by said image sensing means.

40. The apparatus according to claim 39, wherein said image sensing means comprises:

an image sensing device; and displacing means for displacing said image sensing device relative to an optical image projected onto said image sensing device.

41. The apparatus according to claim 39, wherein said image sensing means comprises a plurality of image sensing devices which are displaced from each other by a predetermined distance in a predetermined direction.

42. The apparatus according to claim 39, wherein said image sensing means comprises an image sensing device, and said control means sets a charge accumulation time of said image sensing device for the at least one image to be different from charge accumulation times for the other images.

43. The apparatus according to claim 39, wherein said control means sets a light amount for the at least one image to be different from light amounts for the other images.

44. The apparatus according to claim 39, further comprising:

synthesizing means for synthesizing the sequence of images.

45. A synthesizing apparatus comprising:

input means for inputting a sequence of images which are formed based on a single object and are displaced from each other, an exposure amount for at least one of the sequence of images being set to be different from exposure amounts for other images of the sequence of images in synchronism with the timing when the images are displaced; and synthesizing means for synthesizing the sequence of images input from said input means.

46. The apparatus according to claim 45, wherein said input means comprises image sensing means for converting an optical image into an electrical signal.

47. The apparatus according to claim 46, wherein said image sensing means comprises:

an image sensing device; and displacing means for displacing said image sensing device relative to an optical image projected onto said image sensing device.

48. The apparatus according to claim 46, wherein said image sensing means comprises a plurality of image sensing devices which are displaced from each other by a predetermined distance in a predetermined direction.

49. The apparatus according to claim 46, wherein said image sensing means comprises an image sensing device, and said control means sets a charge accumulation time of said image sensing device for the at least one image to be different from charge accumulation times for the other images.

50. The apparatus according to claim 45, wherein said control means sets a light amount for the at least one image to be different from light amounts for the other images.

51. The apparatus according to claim 45, wherein said input means comprises reproduction means for reproducing a sequence of images from a recording medium which pre-records a sequence of images.

52. A synthesizing method comprising the steps of:

inputting a sequence of images which are formed based on a single object and are displaced from each other, while an exposure amount for at least one of the sequence of images being set to be different from exposure amounts for other images o the sequence of images in synchronism with each displacement of the images; and synthesizing the sequence of input images.

53. The method according to claim 52, wherein the input step includes the image sensing step of converting an optical image into an electrical signal.

54. The method according to claim 53, wherein the image sensing step includes the step of displacing an image sensing device relative to an optical image projected onto the image sensing device.

55. The method according to claim 53, wherein the image sensing step includes the step of performing image sensing operations using a plurality of image sensing devices which are displaced from each other by a predetermined distance in a predetermined direction.

56. The method according to claim 52, wherein of the sequence of images input in the input step, an accumulation time of an image sensing device for the at least one image is set to be different from accumulation times for the other images.

57. The method according to claim 52, wherein of the sequence of images input in the input step, a light amount for the at least one image is set to be different from light amounts for the other images.

58. The method according to claim 52, wherein the input step includes the step of reproducing a sequence of images from a recording medium which pre-records a sequence of images.

59. An image sensing method comprising:

the image sensing step of forming a sequence of images which are formed based on a single object and are displaced from each other; and the control step of setting an exposure amount for at least one of the sequence of images to be different from exposure amounts for other images of the sequence of images in synchronism with each displacement of the sequence of images in the image sensing step.

60. The method according to claim 59, wherein the image sensing step includes the step of displacing an image sensing device relative to an optical image projected onto the image sensing device.

61. The method according to claim 59, wherein the image sensing step includes the step of sensing images using a plurality of image sensing devices which are displaced from each other by a predetermined distance in a predetermined direction.

62. The method according to claim 59, wherein of the sequence of images sensed in the image sensing step, a charge accumulation time of an image sensing device for the at least one image is set to be different from charge accumulation times for the other images.

63. The method according to claim 59, wherein of the sequence of images sensed in the image sensing step, a light amount for the at least one image is set to be different from light amounts for the other images.

* * * * *

UNITED STATES PATENT AND TRADEMARK OFFICE
CERTIFICATE OF CORRECTION

PATENT NO. : 7,095,434 B1　　　　　　　　　　　　　　　　　　　Page 1 of 1
APPLICATION NO. : 08/505608
DATED : August 22, 2006
INVENTOR(S) : Ikeda It is certified that error appears in the above-identified patent and that said Letters Patent is hereby corrected as shown below:

In Column 8, Line 64, change "Ġ,Ŷ" to --Ⓖ, Ⓨ--;

In Column 9, Line 55, change "M" to -- Ⓜ --;

In Column 10, Line 60, change "M or Ċ" to -- Ⓜ or ©--;

In Column 14, Line 5, change "M or Ċ" to -- Ⓜ or ©--;

In Column 14, Line 66, change "1" to --①--;

In Column 15, Lines 12, change "2" to --②--;

In Column 15, Lines 15, change "3" to --③--; and

In Column 15, Lines 16, change "4" to --④--.

Signed and Sealed this

First Day of May, 2007

JON W. DUDAS
*Director of the United States Patent and Trademark Office*